United States Patent
Iwaki et al.

(10) Patent No.: US 11,321,039 B2
(45) Date of Patent: *May 3, 2022

(54) INFORMATION PROCESSOR AND PROGRAM

(71) Applicant: Semiconductor Energy Laboratory Co., Ltd., Atsugi (JP)

(72) Inventors: Yuji Iwaki, Isehara (JP); Katsuki Yanagawa, Aiko (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,932

(22) Filed: Mar. 17, 2020

(65) Prior Publication Data

US 2020/0218485 A1 Jul. 9, 2020

Related U.S. Application Data

(63) Continuation of application No. 14/284,793, filed on May 22, 2014, now Pat. No. 10,628,103.

(30) Foreign Application Priority Data

Jun. 7, 2013 (JP) .................................. 2013-120654

(51) Int. Cl.
*G06F 3/14* (2006.01)
*G06F 3/147* (2006.01)
(Continued)

(52) U.S. Cl.
CPC .............. *G06F 3/14* (2013.01); *G06F 1/1615* (2013.01); *G06F 1/1652* (2013.01); *G06F 3/147* (2013.01);
(Continued)

(58) Field of Classification Search
CPC ........ G06F 1/1615; G06F 1/1652; G06F 3/14; G06F 3/147; G09G 2320/0686;
(Continued)

(56) References Cited

U.S. PATENT DOCUMENTS

| 6,377,324 B1 | 4/2002 | Katsura |
| 6,577,496 B1 | 6/2003 | Gioscia et al. |

(Continued)

FOREIGN PATENT DOCUMENTS

| CN | 101120295 A | 2/2008 |
| CN | 101782804 A | 7/2010 |

(Continued)

OTHER PUBLICATIONS

International Search Report (Application No. PCT/JP2014/064557) dated Jul. 22, 2014.

(Continued)

*Primary Examiner* — David D Davis
(74) *Attorney, Agent, or Firm* — Robinson Intellectual Property Law Office; Eric J. Robinson

(57) ABSTRACT

A novel bendable and highly portable information processor is provided. In addition, a novel information processor capable of displaying information or the like on a seamless large screen is provided. A novel information processor in which one display region can be divided into two regions at a bend position is provided. A novel information processor in which different images or images for different purposes can be displayed in the respective regions is provided. The present inventors have conceived a program including a step of dividing the display region and displaying image data in the respective regions when a display unit of the information processor is bent.

5 Claims, 9 Drawing Sheets

(51) Int. Cl.
*G09G 5/14* (2006.01)
*G06F 1/16* (2006.01)

(52) U.S. Cl.
CPC ....... *G09G 5/14* (2013.01); *G09G 2320/0686* (2013.01); *G09G 2340/04* (2013.01); *G09G 2340/0407* (2013.01); *G09G 2380/02* (2013.01)

(58) Field of Classification Search
CPC ....... G09G 2340/04; G09G 2340/0407; G09G 2380/02; G09G 5/14
See application file for complete search history.

(56) References Cited

U.S. PATENT DOCUMENTS

| | | | |
|---|---|---|---|
| 6,819,304 | B2 | 11/2004 | Branson |
| 7,636,794 | B2 | 12/2009 | Ramos et al. |
| 7,714,801 | B2 | 5/2010 | Kimmel |
| 8,319,725 | B2 | 11/2012 | Okamoto et al. |
| 8,405,605 | B2 | 3/2013 | Sugahara |
| 8,482,086 | B2 | 7/2013 | Shimoyama et al. |
| 8,543,166 | B2 | 9/2013 | Choi et al. |
| 8,547,197 | B2 | 10/2013 | Byun et al. |
| 8,581,859 | B2 | 11/2013 | Okumura et al. |
| 8,780,071 | B2 | 7/2014 | Chen et al. |
| 8,803,816 | B2 | 8/2014 | Kilpatrick, II et al. |
| 8,836,611 | B2 | 9/2014 | Kilpatrick, II et al. |
| 8,860,632 | B2 | 10/2014 | Kilpatrick, II et al. |
| 8,860,765 | B2 | 10/2014 | Kilpatrick, II et al. |
| 8,863,038 | B2 | 10/2014 | King et al. |
| 8,866,840 | B2 | 10/2014 | Dahl et al. |
| 8,899,791 | B2 | 12/2014 | Liu |
| 8,933,874 | B2 | 1/2015 | Lundqvist et al. |
| 8,947,320 | B2 | 2/2015 | King et al. |
| 9,009,984 | B2 | 4/2015 | Caskey et al. |
| 9,323,446 | B2 | 4/2016 | Seo et al. |
| 9,489,078 | B2 | 11/2016 | Seo et al. |
| 9,489,079 | B2 | 11/2016 | Seo et al. |
| 9,489,080 | B2 | 11/2016 | Seo et al. |
| 9,495,094 | B2 | 11/2016 | Kang et al. |
| 9,541,958 | B2 | 1/2017 | Seo et al. |
| 9,626,938 | B2 | 4/2017 | Abe |
| 9,823,833 | B2 | 11/2017 | Grant et al. |
| 9,939,953 | B2 | 4/2018 | Abe |
| 10,254,887 | B2 | 4/2019 | Abe |
| 2004/0052044 | A1 | 3/2004 | Mochizuki et al. |
| 2005/0093868 | A1 | 5/2005 | Hinckley |
| 2008/0303782 | A1 | 12/2008 | Grant et al. |
| 2010/0060664 | A1 | 3/2010 | Kilpatrick, II et al. |
| 2010/0064244 | A1 | 3/2010 | Kilpatrick, II et al. |
| 2010/0064536 | A1 | 3/2010 | Caskey et al. |
| 2010/0066643 | A1 | 3/2010 | King et al. |
| 2010/0079355 | A1 | 4/2010 | Kilpatrick, II et al. |
| 2010/0085274 | A1 | 4/2010 | Kilpatrick, II et al. |
| 2010/0085382 | A1 | 4/2010 | Lundqvist et al. |
| 2010/0164888 | A1 | 7/2010 | Okumura et al. |
| 2011/0043976 | A1 | 2/2011 | Visser et al. |
| 2011/0126141 | A1 | 5/2011 | King et al. |
| 2011/0134144 | A1 | 6/2011 | Moriwaki |
| 2011/0216064 | A1 | 9/2011 | Dahl et al. |
| 2012/0038570 | A1 | 2/2012 | Delaporte |
| 2012/0217516 | A1 | 8/2012 | Hatano et al. |
| 2012/0235894 | A1 | 9/2012 | Phillips |
| 2012/0242599 | A1 | 9/2012 | Seo et al. |
| 2012/0306782 | A1 | 12/2012 | Seo et al. |
| 2012/0307423 | A1 | 12/2012 | Bohn et al. |
| 2012/0329528 | A1 | 12/2012 | Song |
| 2013/0010405 | A1* | 1/2013 | Rothkopf .............. G06F 1/1681 361/679.01 |
| 2013/0050270 | A1* | 2/2013 | Joo .................... G06F 1/1652 345/661 |
| 2013/0127918 | A1 | 5/2013 | Kang et al. |
| 2014/0015743 | A1 | 1/2014 | Seo et al. |
| 2014/0098028 | A1 | 4/2014 | Kwak et al. |
| 2017/0052698 | A1 | 2/2017 | Seo et al. |
| 2017/0116965 | A1 | 4/2017 | Kwak et al. |
| 2019/0196648 | A1 | 6/2019 | Abe |

FOREIGN PATENT DOCUMENTS

| | | |
|---|---|---|
| CN | 102087824 A | 6/2011 |
| CN | 102150095 A | 8/2011 |
| CN | 102723058 A | 10/2012 |
| CN | 202602738 U | 12/2012 |
| CN | 202790058 U | 3/2013 |
| CN | 103050064 A | 4/2013 |
| EP | 2202624 A | 6/2010 |
| EP | 2333761 A | 6/2011 |
| EP | 2354908 A | 8/2011 |
| EP | 2500898 A | 9/2012 |
| EP | 2674834 A | 12/2013 |
| EP | 2755459 A | 7/2014 |
| EP | 3057385 A | 8/2016 |
| EP | 3190476 A | 7/2017 |
| JP | 2002-278515 A | 9/2002 |
| JP | 2005-141715 A | 6/2005 |
| JP | 2006-208424 A | 8/2006 |
| JP | 2006-243621 A | 9/2006 |
| JP | 2007-333797 A | 12/2007 |
| JP | 2009-222415 A | 10/2009 |
| JP | 2009-231183 A | 10/2009 |
| JP | 2010-157060 A | 7/2010 |
| JP | 2010-529555 | 8/2010 |
| JP | 2010-224480 A | 10/2010 |
| JP | 2011-118245 A | 6/2011 |
| JP | 2012-502370 | 1/2012 |
| JP | 2012-190794 A | 10/2012 |
| JP | 2013-105312 A | 5/2013 |
| JP | 2013-225052 A | 10/2013 |
| JP | 2015-015018 A | 1/2015 |
| KR | 2008-0035709 A | 4/2008 |
| KR | 2011-0053269 A | 5/2011 |
| KR | 2011-0055718 A | 5/2011 |
| KR | 2011-0063298 A | 6/2011 |
| TW | 201024977 | 7/2010 |
| TW | 201128502 | 8/2011 |
| TW | 201203196 | 1/2012 |
| TW | 201212768 | 3/2012 |
| WO | WO-2006/072670 | 7/2006 |
| WO | WO-2008/150600 | 12/2008 |
| WO | WO-2010/028394 | 3/2010 |
| WO | WO-2010/028397 | 3/2010 |
| WO | WO-2010/028399 | 3/2010 |
| WO | WO-2010/028402 | 3/2010 |
| WO | WO-2010/028403 | 3/2010 |
| WO | WO-2010/028404 | 3/2010 |
| WO | WO-2010/028405 | 3/2010 |
| WO | WO-2010/028406 | 3/2010 |
| WO | WO-2010/028407 | 3/2010 |
| WO | WO-2012/108668 | 8/2012 |
| WO | WO-2012/108715 | 8/2012 |
| WO | WO-2012/108722 | 8/2012 |
| WO | WO-2012/108723 | 8/2012 |
| WO | WO-2012/108729 | 8/2012 |
| WO | WO-2013/077537 | 5/2013 |
| WO | WO-2013/191488 | 12/2013 |
| WO | WO-2014/196485 | 12/2014 |

OTHER PUBLICATIONS

Written Opinion (Application No. PCT/JP2014/064557) dated Jul. 22, 2014.
Taiwanese Office Action (Application No. 103118444) dated Jan. 24, 2018.
Chinese Office Action (Application No. 201480032026.2) dated Mar. 20, 2018.
Chinese Office Action (Application No. 201480032026.2) dated Nov. 15, 2018.

* cited by examiner

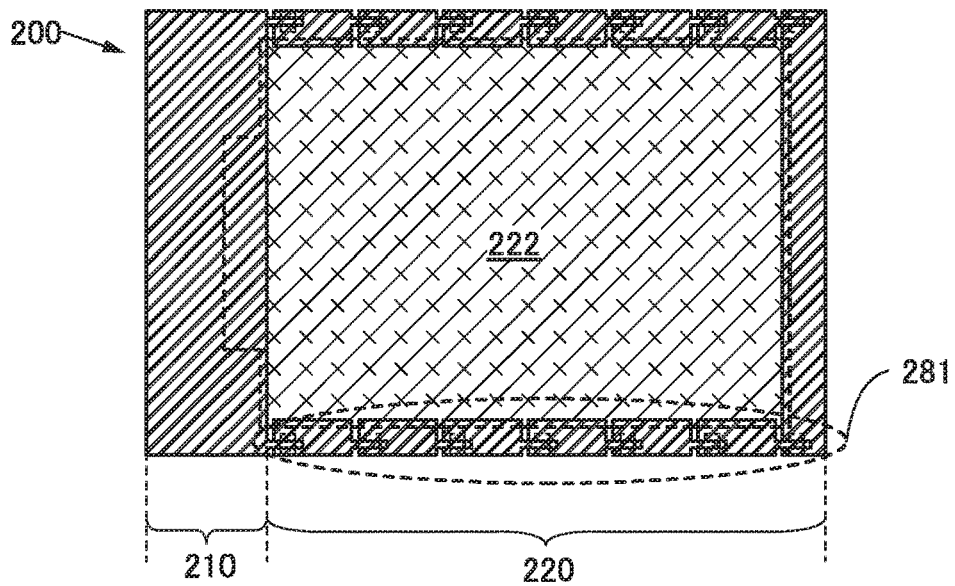
FIG. 4A
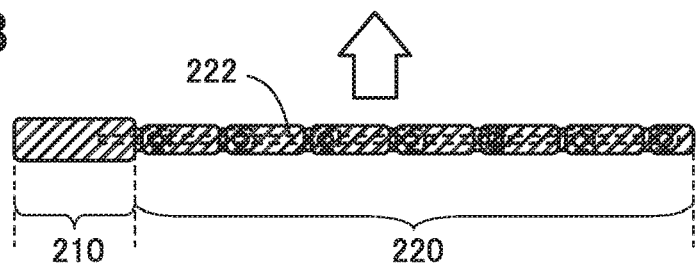
FIG. 4B
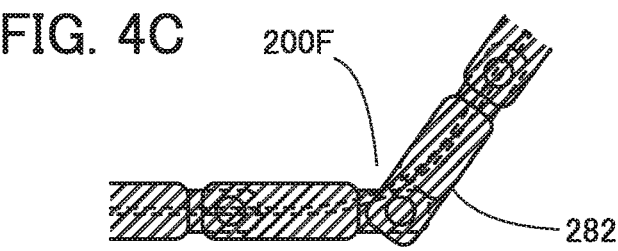
FIG. 4C
FIG. 4D1
FIG. 4D2
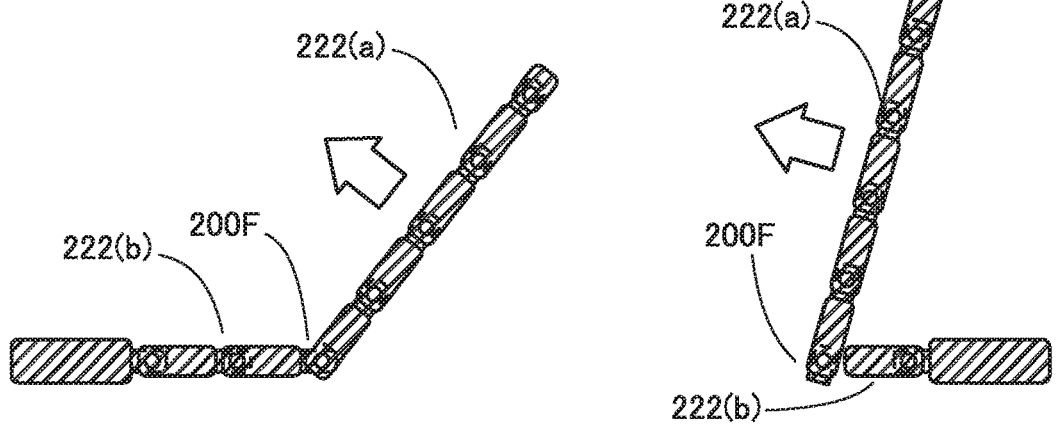

INFORMATION PROCESSOR AND PROGRAM

TECHNICAL FIELD

The present invention relates to an object, a method, or a manufacturing method. In addition, the present invention relates to a process, a machine, manufacture, or a composition of matter. In particular, the present invention relates to, for example, a human interface, a semiconductor device, a display device, a light-emitting device, a power storage device, a driving method thereof, or a manufacturing method thereof. In particular, the present invention relates to, for example, a method and a program for processing and displaying image data, and a device including a recording medium in which the program is recorded. In particular, the present invention relates to, for example, a method for processing and displaying image data by which an image including information processed by an information processor provided with a display portion is displayed, a program for displaying an image including information processed by an information processor provided with a display portion, and an information processor including a recording medium in which the program is recorded.

BACKGROUND ART

Display devices with large screens can display many pieces of information. Therefore, such display devices are excellent in browsability and suitable for information processors.

The social infrastructures relating to means for transmitting information have advanced. This has made it possible to acquire, process, and send out many pieces and various kinds of information with the use of an information processor not only at home or office but also at other visiting places.

With this being the situation, portable information processors are under active development.

For example, portable information processors are often used outdoors, and force might be accidentally applied by dropping to the information processors and display devices included in them. As an example of a display device that is not easily broken, a display device having high adhesiveness between a structure body by which a light-emitting layer is divided and a second electrode layer is known (Patent Document 1).

REFERENCE

Patent Document

[Patent Document 1] Japanese Published Patent Application No. 2012-190794

DISCLOSURE OF INVENTION

One embodiment of the present invention is made in view of the foregoing technical background. One object is to provide a novel bendable and highly portable information processor. Another object is to provide a novel information processor capable of displaying information or the like on a seamless large screen.

Note that the descriptions of these objects do not preclude the existence of other objects. In one embodiment of the present invention, there is no need to achieve all the objects. Other objects will be apparent from and can be derived from the description of the specification, the drawings, the claims, and the like.

One embodiment of the present invention is an information processor including: an arithmetic device that receives bend position data and an operation instruction including a display termination instruction and supplies image data; and an input/output device that receives the image data and supplies the bend position data and the operation instruction. The arithmetic device includes an arithmetic unit and a storage unit that stores a program to be executed by the arithmetic unit. The input/output device includes a bendable display unit and a bend position sensor that senses a position where the display unit is bent and supplies the bend position data.

The program includes: a first step of initializing a timer or the like; a second step of allowing interrupt processing; a third step of displaying an image that has been generated in the interrupt processing; a fourth step of returning to the third step when the display termination instruction has not been input in the interrupt processing and proceeding to a fifth step when the display termination instruction has been input in the interrupt processing; and the fifth step of terminating the program.

The interrupt processing includes: a sixth step of receiving the display termination instruction and the bend position data; a seventh step of proceeding to an eighth step when the bend position data has not been supplied in the sixth step and proceeding to a ninth step when the bend position data has been supplied in the sixth step; the eighth step of generating an image that is not divided and is to be displayed in the display unit; the ninth step of generating an image that is divided into a first region and a second region at the bend position; and a tenth step of recovering from the interrupt processing.

The above information processor of one embodiment of the present invention displays a divided image on the display unit when the display unit is bent. Thus, one display unit can be divided into two regions at the bend position, and consequently, different images can be displayed in the respective regions.

Furthermore, a novel bendable and highly portable information processor can be provided. In addition, a novel information processor capable of displaying information or the like on a seamless large screen can be provided. Note that an "image" in this specification includes information that can be perceived visually, such as characters and symbols.

Another embodiment of the present invention is the above information processor. The program includes, instead of the above interrupt processing, interrupt processing that includes: a sixth step of receiving the display termination instruction and the bend position data; a seventh step of proceeding to an eighth step when the bend position data has not been supplied in the sixth step and proceeding to a tenth step when the bend position data has been supplied in the sixth step; the eighth step of selecting one image; a ninth step of generating an image that is not divided and is to be displayed in the display unit from the one image selected in the eighth step; the tenth step of selecting two images; an eleventh step of generating an image that is divided into a first region and a second region at the bend position from the two images selected in the tenth step; and a twelfth step of recovering from the interrupt processing.

In the above information processor of one embodiment of the present invention, one display region can be divided into two regions at the bend position, and an image to be displayed in one of the regions can be selected. In addition, one or a plurality of images can be selected to be displayed depending on how the display region is bent.

Furthermore, a novel bendable and highly portable information processor can be provided. In addition, a novel information processor capable of displaying information or the like on a seamless large screen can be provided.

Another embodiment of the present invention is the above information processor. The program includes, instead of the above interrupt processing, interrupt processing that includes: a sixth step of receiving the display termination instruction and the bend position data; a seventh step of proceeding to an eleventh step when the bend position data has not been supplied in the sixth step and proceeding to an eighth step when the bend position data has been supplied in the sixth step; the eighth step of proceeding to the eleventh step when the display unit has not been bent outward and proceeding to a ninth step when the display unit has been bent outward; the ninth step of identifying the bend position that is closest to a center of the display unit; a tenth step of generating an image in which pixels values of pixels between the bend position and an edge that is on a side closer to the bend position are 0; and the eleventh step of recovering from the interrupt processing.

In the above information processor of one embodiment of the present invention, the display unit can be bent outward, and a portion between the bend position and the edge farther therefrom can be used for display and display in a portion between the bend position and the edge closer thereto can be stopped. Thus, power consumed by a region that is not used by a user can be reduced. Further, it is possible to prevent others from secretly looking at information displayed in the region that is not used by the user.

Another embodiment of the present invention is a program that is stored in a storage unit of an information processor and is to be executed by an arithmetic unit of the information processor. The information processor includes: an input/output device that includes a bendable display unit and a bend position sensor configured to sense a position where the display unit is bent and supply bend position data, receives image data, and supplies the bend position data and an operation instruction including a display termination instruction; and an arithmetic device that includes an arithmetic unit and a storage unit, receives the bend position data and the operation instruction, and supplies the image data.

The program includes: a first step of initializing a timer or the like; a second step of allowing interrupt processing; a third step of displaying an image that has been generated in the interrupt processing; a fourth step of returning to the third step when a display termination instruction has not been input in the interrupt processing and proceeding to a fifth step when the display termination instruction has been input in the interrupt processing; and the fifth step of terminating the program. The interrupt processing includes: a sixth step of receiving the display termination instruction and the bend position data; a seventh step of proceeding to an eighth step when the bend position data has not been supplied in the sixth step and proceeding to a ninth step when the bend position data has been supplied in the sixth step; the eighth step of generating an image that is not divided and is to be displayed in the display unit; the ninth step of generating an image that is divided into a first region and a second region at the bend position; and a tenth step of recovering from the interrupt processing.

In accordance with the above program of one embodiment of the present invention, a divided image can be displayed on the display unit depending on how the display region is bent. Thus, one display unit can be divided into two regions at the bend position, and consequently, different images can be displayed in the respective regions.

Another embodiment of the present invention is the above program including, instead of the above interrupt processing, interrupt processing that includes: a sixth step of receiving the display termination instruction and the bend position data; a seventh step of proceeding to an eighth step when the bend position data has not been supplied in the sixth step and proceeding to a tenth step when the bend position data has been supplied in the sixth step; the eighth step of selecting one image; a ninth step of generating an image that is not divided and is to be displayed in the display unit from the one image selected in the eighth step; the tenth step of selecting two images; an eleventh step of generating an image that is divided into a first region and a second region at the bend position from the two images selected in the tenth step; and a twelfth step of recovering from the interrupt processing.

In accordance with the above program of one embodiment of the present invention, one display region can be divided into two regions at the bend position, and an image to be displayed in one of the regions can be selected. In addition, one or a plurality of images can be selected to be displayed depending on how the display region is bent.

Another embodiment of the present invention is the above program including, instead of the above interrupt processing, interrupt processing that includes: a sixth step of receiving the display termination instruction and the bend position data; a seventh step of proceeding to an eleventh step when the bend position data has not been supplied in the sixth step and proceeding to an eighth step when the bend position data has been supplied in the sixth step; the eighth step of proceeding to the eleventh step when the display unit has not been bent outward and proceeding to a ninth step when the display unit has been bent outward; the ninth step of identifying the bend position that is closest to a center of the display unit; a tenth step of generating an image in which pixels values of pixels between the bend position and an edge that is on a side closer to the bend position are 0; and the eleventh step of recovering from the interrupt processing.

In accordance with the above program of one embodiment of the present invention, the display unit can be bent outward, and a portion between the bend position and the edge farther therefrom can be used for display and display in a portion between the bend position and the edge closer thereto can be stopped. Thus, power consumed by a region that is not used by a user can be reduced. Further, it is possible to prevent others from secretly looking at information displayed in the region that is not used by the user.

Note that a light-emitting device in this specification means an image display device or a light source (including a lighting device). In addition, the light-emitting device includes any of the following modules in its category: a module in which a connector such as a flexible printed circuit (FPC) or a tape carrier package (TCP) is attached to a light-emitting device; a module having a TCP provided with a printed wiring board at the end thereof; and a module having an integrated circuit (IC) directly mounted on a substrate over which a light-emitting element is formed by a chip on glass (COG) method.

According to one embodiment of the present invention, a novel bendable and highly portable information processor can be provided. In addition, a novel information processor capable of displaying information or the like on a seamless large screen can be provided.

BRIEF DESCRIPTION OF DRAWINGS

FIGS. 1A, 1B1, and 1B2 are a block diagram and schematic views illustrating a structure of an information processor of one embodiment.

FIGS. 4A, 4B, 4C, 4D1, and 4D2 illustrate an information processor of one embodiment.

FIGS. 6A, 6B1, and 6B2 are a flow chart and schematic views illustrating a method for driving an information processor of one embodiment.

BEST MODE FOR CARRYING OUT THE INVENTION

Figure 1A:
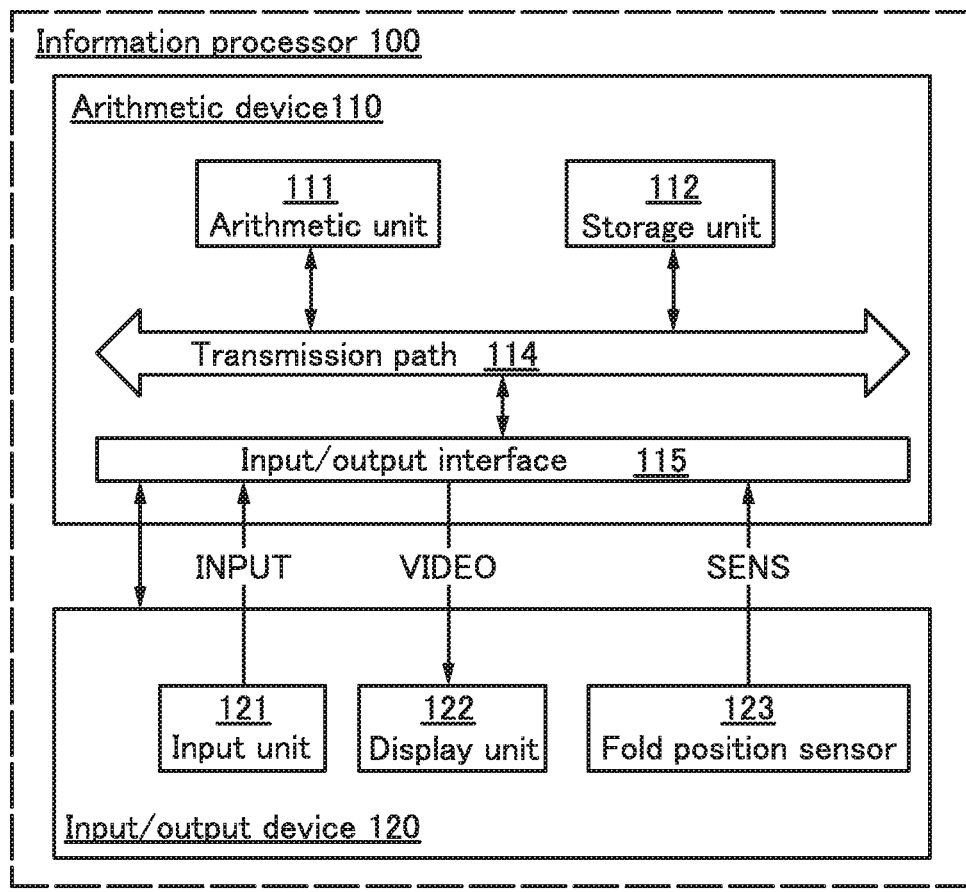

Embodiments will be described in detail with reference to drawings. Note that the present invention is not limited to the description below, and it is easily understood by those skilled in the art that various changes and modifications can be made without departing from the spirit and scope of the present invention. Therefore, the present invention should not be construed as being limited to the description in the following embodiments. Note that in the structures of the invention described below, the same portions or portions having similar functions are denoted by the same reference numerals in different drawings, and description of such portions is not repeated.

Embodiment 1

In this embodiment, a structure of an information processor of one embodiment of the present invention will be described with reference to FIGS. 1A, 1B1, and 1B2, FIGS. 2A and 2B, and FIG. 3.

FIG. 1A is a block diagram illustrating the structure of the information processor of one embodiment of the present invention.

Figure 1A:
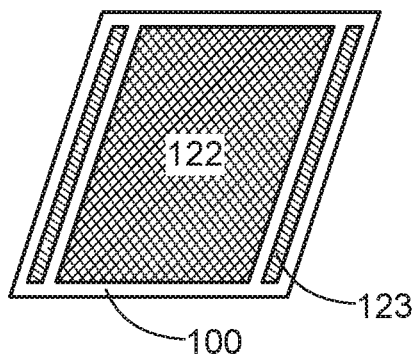
Figure 1A:
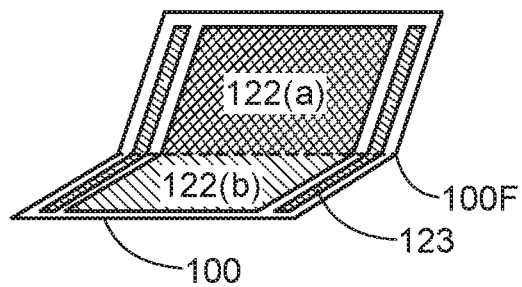

FIGS. 1B1 and 1B2 are schematic views illustrating the structure of the information processor of one embodiment of the present invention. FIG. 1B2 is a schematic view illustrating the information processor in FIG. 1B1 in a bent state.

Figure 2A:
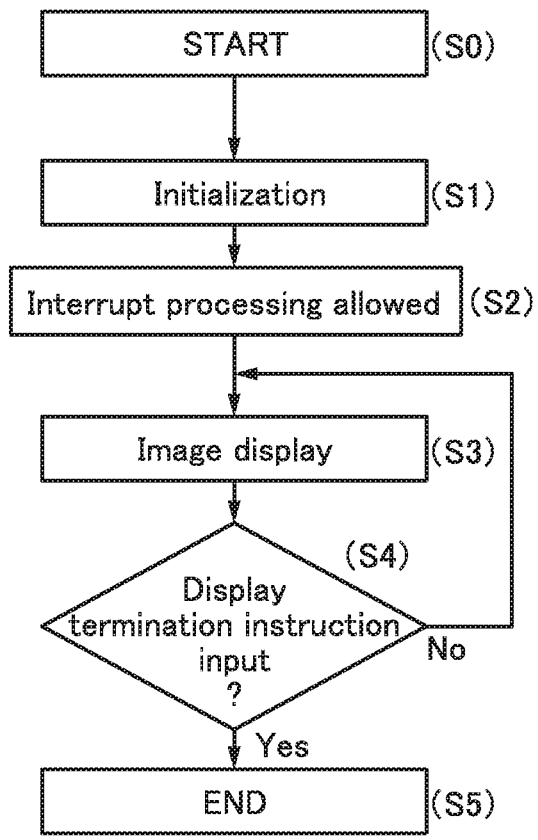
FIGS. 2A and 2B are flow charts illustrating a method for driving an information processor of one embodiment.
Figure 2B:
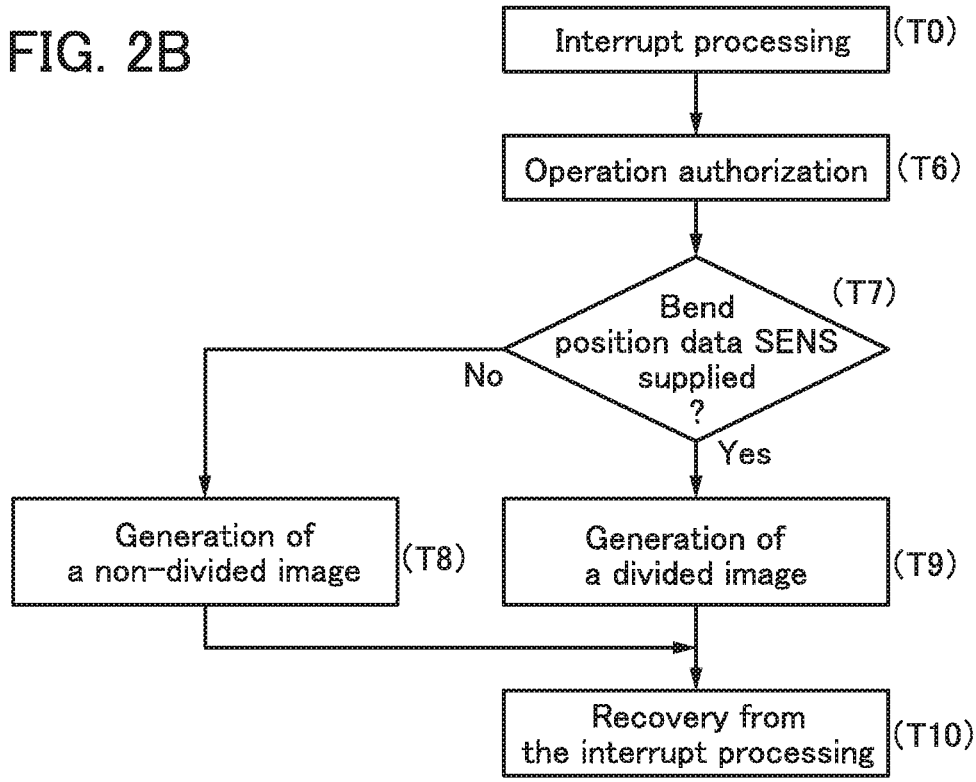

FIGS. 2A and 2B are flow charts illustrating a program to be executed by an arithmetic unit of the information processor of one embodiment of the present invention.

Figure 3:
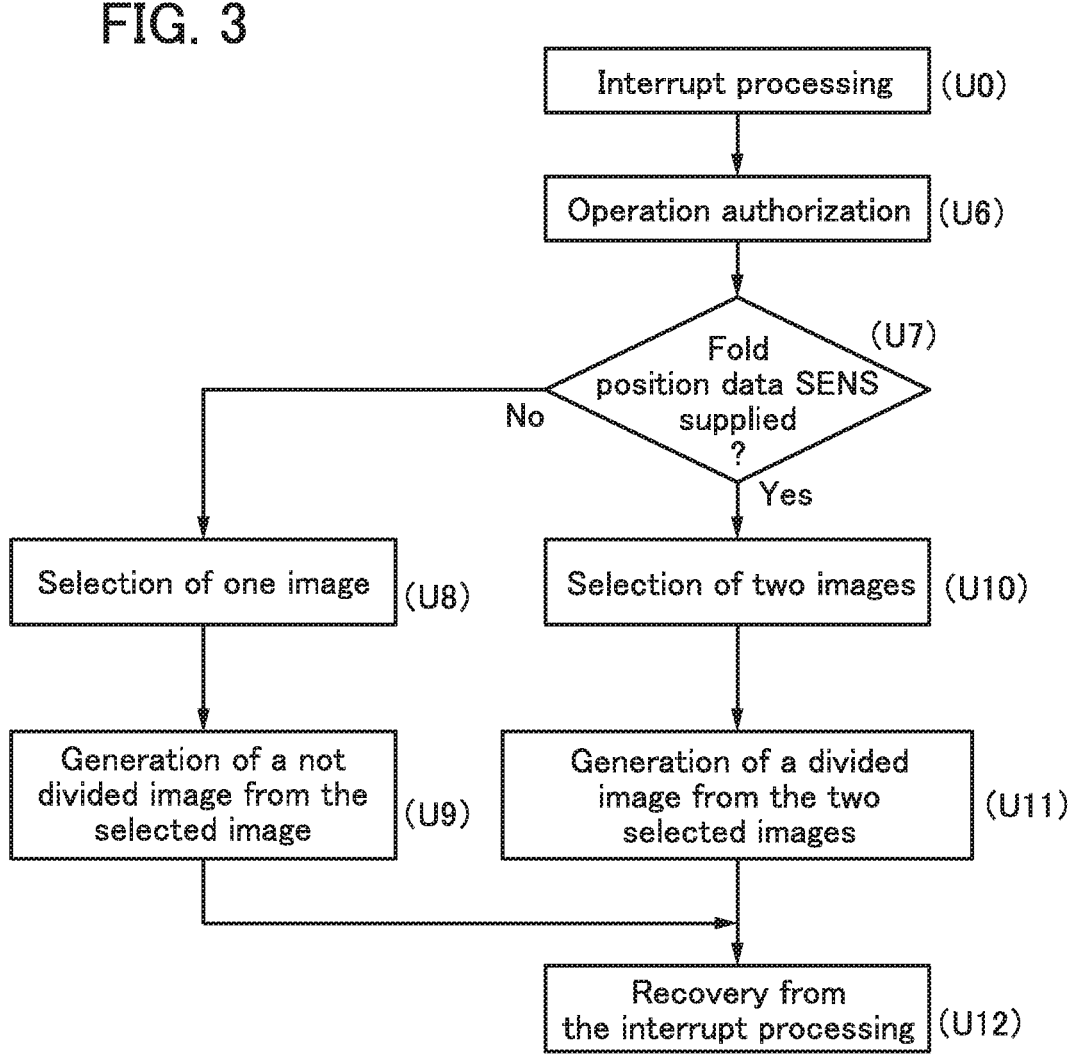
FIG. 3 is a flow chart illustrating a method for driving an information processor of one embodiment.

FIG. 3 is a flow chart showing a modification example of the program to be executed by the arithmetic unit of the information processor of one embodiment of the present invention.

<Information Processor>

An information processor 100 described in this embodiment includes an arithmetic device 110. The arithmetic device 110 receives bend position data SENS and an operation instruction INPUT including a display termination instruction, and supplies image data VIDEO. The arithmetic device 110 includes an arithmetic unit 111 and a storage unit 112 that stores a program to be executed by the arithmetic unit 111 (see FIG. 1A).

The information processor 100 also includes an input/output device 120. The input/output device 120 receives image data VIDEO, and supplies bend position data SENS and an operation instruction INPUT including a display termination instruction. The input/output device 120 includes a bendable display unit 122 and a bend position sensor 123 that senses the position at which the display unit 122 is bent and supplies bend position data SENS (see FIG. 1B1).

<<Program>>

The program to be executed by the arithmetic unit 111 includes the following steps (see FIGS. 2A and 2B).

In a first step, a timer or the like is initialized (see (S1) in FIG. 2A). Note that this initialization step also includes the operation of reading image data that is to be used in an interrupt processing which is described later.

In a second step, the interrupt processing is allowed. When the interrupt processing is allowed, the main processing can be stopped and the interrupt processing described later can be executed (see (S2) in FIG. 2A).

In a third step, an image that has been generated in the interrupt processing allowed in the second step is displayed (see (S3) in FIG. 2A).

In a fourth step, the operation returns to the third step in the case where a display termination instruction has not been input in the interrupt processing, and proceeds to a fifth step in the case where a display termination instruction has been input in the interrupt processing (see (S4) in FIG. 2A).

In the fifth step, the program is terminated (see (S5) in FIG. 2A).

The interrupt processing will be described (see FIG. 2B). Note that when the interrupt processing is allowed, the arithmetic unit can receive an instruction to execute the interrupt processing. The arithmetic unit that has received the instruction to execute the interrupt processing stops the main processing and executes the interrupt processing. For example, the arithmetic unit that has received an event associated with the instruction executes the interrupt processing and stores the execution result in the storage unit. Then, the arithmetic unit that has recovered from the interrupt processing can resume the main processing on the basis of the execution result of the interrupt processing.

In a sixth step, a display termination instruction and bend position data SENS are received. A user of the information processor 100 can input a display termination instruction with, for example, an input unit 121 (see (T6) in FIG. 2B).

In a seventh step, the operation proceeds to an eighth step in the case where bend position data SENS has not been supplied in the sixth step, and proceeds to a ninth step in the case where bend position data SENS has been supplied in the sixth step (see (T7) in FIG. 2B). For example, when the display unit 122 that has been in a bent state is put in a non-bent state and thus supply of bend position data SENS is stopped, the operation proceeds to the eighth step. Conversely, when the display unit 122 is put in a bent state and thus bend position data SENS is supplied, the operation proceeds to the ninth step.

In the eighth step, an image to be displayed on the display unit 122 is generated. Note that the image generated in this step is not divided at a position where the display unit 122 can be bent. The image can be generated from, for example, the image data that has been read in the first step (see (T8) in FIG. 2B).

In the ninth step, an image that is divided into a first region 122(*a*) and a second region 122(*b*) at the bend position is generated (see FIG. 1B2 and (T9) in FIG. 2B). Note that a broken line 100F indicates the bend position.

Although the case where the display unit 122 is bent once along one line is described in this embodiment, one embodiment of the present invention is not limited to this case. For example, the display unit 122 may be bent more than once along more than one lines, and an image that is divided at the bend positions may be displayed.

In a tenth step, the operation recovers from the interrupt processing (see (T10) in FIG. 2B).

In the information processor 100 of one embodiment of the present invention, a display region is divided into the first region 122(*a*) and the second region 122(*b*) and image data are displayed in the respective regions when the display unit 122 is bent. In this manner, one display region can be divided into two regions at the bend position. Consequently, different images or images for different purposes, for example, can be displayed in the respective regions.

Furthermore, a novel bendable and highly portable information processor can be provided. In addition, a novel information processor capable of displaying information or the like on a seamless large screen can be provided. Note that an "image" in this specification includes information that can be perceived visually, such as characters and symbols.

The arithmetic device 110 described as an example in this embodiment includes an input/output interface 115 and a transmission path 114.

The input/output interface 115 can supply data to the input/output device 120 and receive data supplied from the input/output device 120.

The transmission path 114 can supply data to the arithmetic unit 111, the storage unit 112, and the input/output interface 115. In addition, the arithmetic unit 111, the storage unit 112, and the input/output interface 115 can supply data to the transmission path 114.

The input/output device 120 includes the input unit 121. The input unit 121 can supply a display termination instruction and the like.

Note that the display termination instruction is an instruction to terminate the program.

Note that these units cannot be clearly distinguished and one unit also serves as another unit or include part of another unit in some cases. For example, a touch panel serves as the input unit 121 as well as the display unit 122.

Individual components included in the information processor 100 of one embodiment of the present invention are described below.

<<Input/Output Device>>

The input/output device 120 is connected to the transmission path 114 via the input/output interface 115. The input/output device 120 can supply data.

<<Display unit>>

The display unit 122 has flexibility and therefore can be bent. FIG. 1B1 illustrates the display unit 122 that is opened flat, and FIG. 1B2 illustrates the display unit 122 that is bent to have one bend. Note that the number of bends is not limited to one; the display unit 122 can be bent to have n bends (n is a natural number of 1 or more).

A specific structure of the flexible display unit 122 is described in detail in Embodiment 2.

<<Bend position sensor>>

The bend position sensor 123 senses the position at which the display unit 122 is bent and supplies bend position data SENS. For example, in the case where the bend position is determined in advance, a sensor is provided at that position. In the case where there are a plurality of positions where the display unit can be bent, a plurality of sensors are arranged in a line or a matrix, so that coordinates of the bend position can be identified.

For example, the bend position sensor 123 can be provided along the periphery of the display unit 122. In the information processor 100 illustrated in FIG. 1B1, the bend position sensor 123 is provided along the longitudinal direction of the display unit 122. Alternatively, the bend position sensor 123 may be provided along the lateral direction, for example.

Note that the bend position sensor 123 that is provided to surround the display unit 122 can sense bend positions in various (e.g., lateral, longitudinal, and diagonal) directions across the display unit 122. Thus, the display unit 122 can be divided at various positions.

The bend position sensor 123 can be composed of, for example, a switch, a MEMS pressure sensor, a pressure sensor, or the like.

Specifically, a mechanical contact switch, a magnetic switch, or the like may be provided on the display unit 122 to be opened and closed in accordance with the operations of opening and bending the display unit 122.

Alternatively, a plurality of pressure sensors may be provided on the display unit 122. Specifically, a film-like piezoelectric element can be attached to the display unit 122. A rise of pressure with the bending operation is sensed with the pressure sensor, whereby the bend position can be found.

As the piezoelectric element, for example, an organic piezoelectric film can be used. Specifically, a piezoelectric film including polyamino acid, a piezoelectric film including polyvinylidene fluoride, a piezoelectric film including polyester, a piezoelectric film including a chiral polymer, or the like can be used.

Note that the piezoelectric element can serve as both an element for the bend position sensor 123 and an element for a pressure-sensing touch panel.

<<Input Unit>>

As the input unit 121, for example, a human interface or the like can be used. Specifically, a keyboard, a mouse, a touch panel, or the like can be used.

For example, a user of the information processor 100 can input, with the input unit 121, an operation instruction including a display termination instruction, an instruction to select an image, or the like. The user can also input an instruction to select a region, a page turning instruction, or the like.

Furthermore, pseudo bend position data SENS may be input with the input unit 121. Thus, one display unit can be divided into two regions at a position corresponding to the position data input with the input unit 121. Consequently, different images can be displayed in the respective regions, for example.

<<Other Structures>>

As the input/output device 120, for example, a camera, a microphone, a read-only external memory, an external memory, a communication device, a scanner, a speaker, a printer, or the like can be used.

Specifically, examples of a camera include a digital camera and a digital video camera.

Examples of an external memory include a hard disk and a removable memory. Examples of a read-only external memory include a CD-ROM and a DVD-ROM.

Examples of a communication device include a network connection device and a modem.

As a usage example of the information processor 100, a software keyboard may be displayed in the second region 122(b) of the display unit 122 that is divided into two regions.

For example, the first region 122(a) can be used for displaying images, and the second region 122(b) can be used as the input unit 121. Specifically, game software is operated with the software keyboard; thus, the information processor 100 can be used as a game machine.

In the case where the display unit 122 includes light-emitting elements as display elements, it is preferable to display a Character Palette with a color brighter than that of the background, in which case power consumption can be reduced.

Since a seamless display unit is divided into two regions, a user can easily follow, with his/her eyes, the movement of an image from one region to the other region. Consequently, discomfort in operations between the two regions, for example, can be reduced.

In addition, a user can easily follow, with his/her eyes, an image displayed to move from one region to the other region by the arithmetic device 110. Consequently, the user can accurately predict the position of an image that moves between the two regions.

For example, in a game or the like, the movement of a character between the two regions can be predicted accurately.

MODIFICATION EXAMPLE 1

An information processor that is shown as Modification Example 1 in this embodiment will be described with reference to FIG. 3.

FIG. 3 is a flow chart showing a modification example of the program to be executed by the arithmetic unit 111 of the information processor of one embodiment of the present invention.

The information processor shown as Modification Example 1 in this embodiment differs from the information processor described with reference to FIGS. 2A and 2B in the interrupt processing of the program to be executed by the arithmetic unit 111. The portions that differ will be described in detail below. Refer to the above description for portions where the same structures can be employed.

In Modification Example 1 in this embodiment, the program includes the following interrupt processing instead of the above-described interrupt processing. In a sixth step, a display termination instruction and bend position data SENS are received (see (U6) in FIG. 3).

In a seventh step, the operation proceeds to an eighth step in the case where bend position data SENS has not been supplied in the sixth step, and proceeds to a tenth step in the case where bend position data SENS has been supplied in the sixth step (see (U7) in FIG. 3).

In the eighth step, one image is selected from a plurality of images. For example, a plurality of image data are read in the first step, and the image data are displayed in a tiled pattern on the display unit 122 as initial images. A user can select the one image with the input unit 121 (see (U8) in FIG. 3).

In a ninth step, an image that is not divided and is to be displayed on the display unit is generated from the one image selected in the eighth step (see (U9) in FIG. 3).

In the tenth step, two images are selected from a plurality of images. For example, a plurality of image data read in the first step are displayed in a tiled pattern and the user can select the two images with the input unit 121 (see (U10) in FIG. 3).

In an eleventh step, an image that is divided into the first region 122(a) and the second region 122(b) at the bend position is generated from the two images selected in the tenth step (see (U11) in FIG. 3).

In a twelfth step, the operation recovers from the interrupt processing (see (U12) in FIG. 3).

In the information processor shown as a modification example in this embodiment, one display region can be divided into two regions at the bend position, and an image to be displayed on the display unit 122 can be selected.

MODIFICATION EXAMPLE 2

An information processor that is shown as Modification Example 2 in this embodiment will be described with reference to FIGS. 6A, 6B1, and 6B2.

FIGS. 6A, 6B1, and 6B2 are a flow chart and schematic views showing a modification example of the program to be executed by the arithmetic unit 111 of the information processor of one embodiment of the present invention.

The information processor shown as Modification Example 2 in this embodiment differs from the information processor described with reference to FIGS. 2A and 2B in the interrupt processing of the program to be executed by the arithmetic unit 111. Thus, different portions will be described in detail below. Refer to the above description for portions where the same structures can be employed.

In Modification Example 2 in this embodiment, the program includes the following interrupt processing instead of the above-described interrupt processing. In a sixth step, a display termination instruction and bend position data SENS are received (see (V6) in FIG. 6A).

Figure 6A:
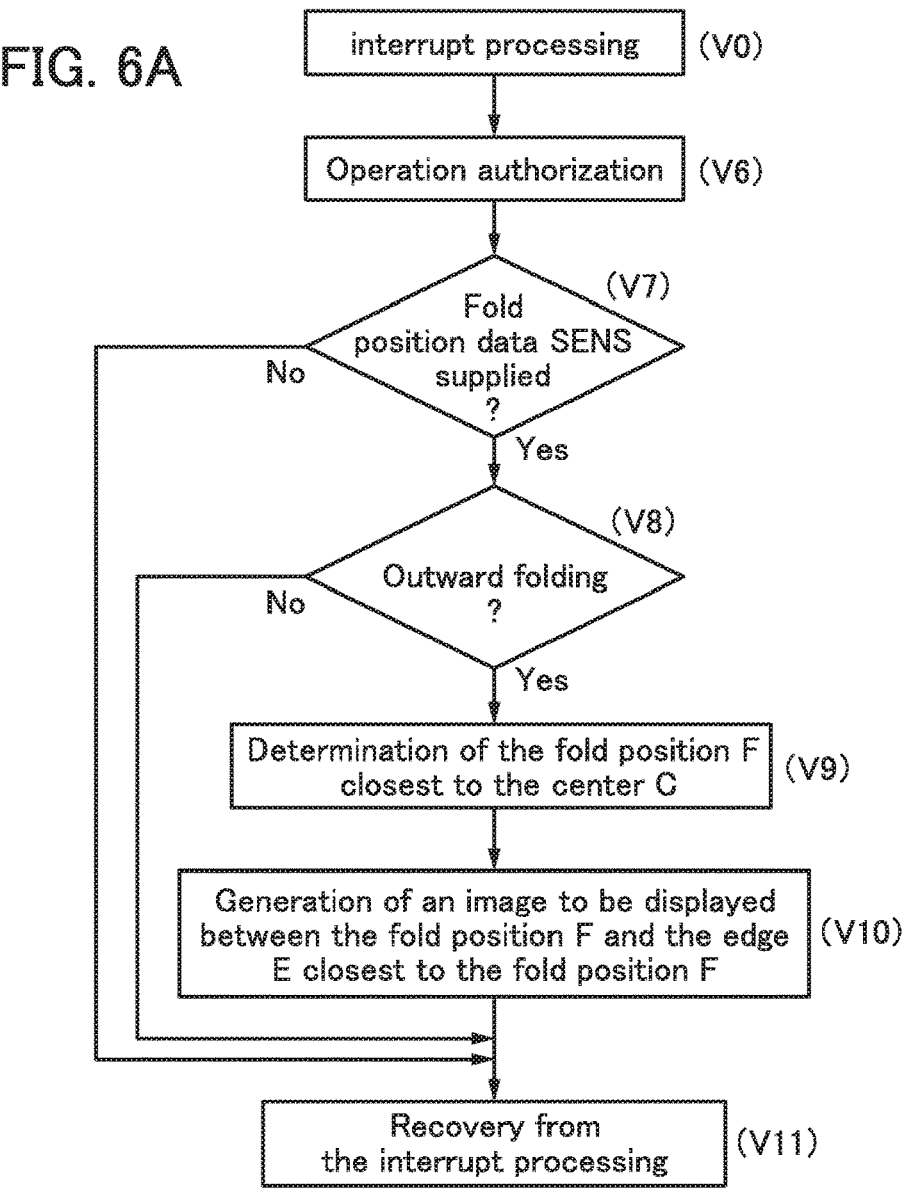
Figure 6A:
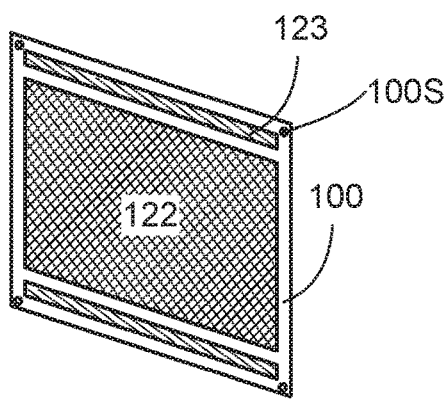
Figure 6A:
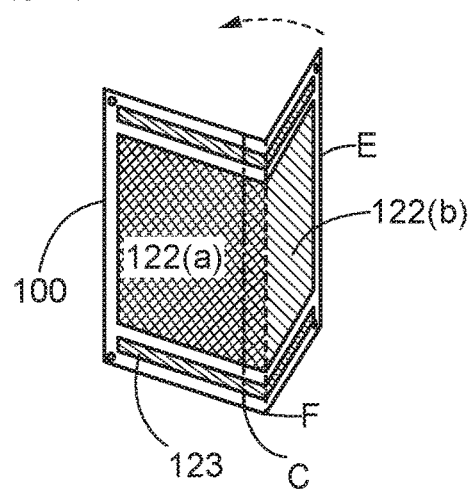

In a seventh step, the operation proceeds to an eleventh step in the case where bend position data SENS has not been supplied in the sixth step, and proceeds to an eighth step in the case where bend position data SENS has been supplied in the sixth step (see (V7) in FIG. 6A).

In the eighth step, the operation proceeds to the eleventh step in the case where the display unit 122 has not been bent outward, and proceeds to a ninth step in the case where the display unit 122 has been bent outward (see (V8) in FIG. 6A).

Note that whether the display unit 122 has been bent outward or inward can be found by using, for example, an acceleration sensor, a shear force sensor, or the like.

Specifically, acceleration sensors 100S provided at the four corners of the display unit 122 are used to sense the acceleration that the four corners undergo when the display unit 122 is bent; thus, the tracks of the four corners of the display unit can be calculated (see FIG. 6B1). In this manner, it can be found whether the display unit has been bent outward or inward (see FIG. 6B2).

It is also possible to use a shear force sensor provided on the display unit 122 to find whether the display unit 122 has been bent outward or inward.

In the ninth step, the bend position F that is closest to the center C of the display unit 122 is identified (see (V9) in FIG. 6A).

The bend position F can be identified from bend position data SENS that is supplied by the bend position sensor. For example, in the case where a bend position sensor in which a plurality of pressure sensors are arranged in a line is used, the bend position F may be the position that is closest to the center C of the display unit 122 and where the pressure sensor has sensed a pressure higher than a predetermined value (see FIG. 6B2).

In a tenth step, an image in which pixel values of pixels between the bend position F and an edge E that is on the side closer to the bend position F are 0 is generated (see (V10) in FIG. 6A).

Specifically, a region between the bend position F and the edge E on the side closer to the bend position F is the second region 122(b), and the other region is the first region 122(a). An image in which pixel values of pixels in the second region are 0, for example, is generated so that an image without shape, pattern, or color is displayed in the second region (see FIG. 6B2). Note that an image including various information can be displayed in the first region 122(a).

In the eleventh step, the operation recovers from the interrupt processing (see (V11) in FIG. 6A).

In the information processor shown as a modification example in this embodiment, the display unit can be bent outward, and a portion between the bend position and the edge farther therefrom can be used for display and display in a portion between the bend position and the edge closer thereto can be stopped. Thus, power consumed by a region that is not used by a user can be reduced. Further, it is possible to prevent others from secretly looking at information displayed in the region that is not used by the user.

This embodiment can be combined with any of the other embodiments in this specification as appropriate.

EMBODIMENT 2

In this embodiment, an information processor of one embodiment of the present invention will be described with reference to FIGS. 4A, 4B, 4C, 4D1, and 4D2.

FIG. 4A is a plan view illustrating a structure of an information processor 200 of one embodiment of the present invention, and FIG. 4B is a side view illustrating the structure of the information processor 200. Note that the arrows in the drawings indicate the side where display is performed.

FIG. 4C is a side view illustrating a structure of part of a bending member 281 illustrated in FIG. 4A.

FIGS. 4D1 and 4D2 are side views illustrating examples in which a display unit 222 is divided into two regions at the position where an input/output device 220 is bent.
<Plan View>

The information processor 200 includes an arithmetic device 210 that receives bend position data and an operation instruction and supplies image data. The information processor 200 also includes the input/output device 220 that receives image data and supplies bend position data and an operation instruction (see FIG. 4A).
<Side View>

The input/output device 220 includes the bending member 281 and the display unit 222 that is supported so as to be bent in accordance with bending of the bending member 281. Note that the display unit 222 is positioned roughly at the center of the bending member 281 when seen from the side (see FIG. 4B).

The bending member 281 is provided along each of opposite sides of the display unit 222.

The bending member 281 includes one or more hinge components 282 (see FIG. 4C). Thus, the bending member 281 can be bent at one or a plurality of positions. Note that the hinge component 282 may be provided with a ratchet mechanism, a unit to prevent slipping, or the like so that the bend angle can be adjusted as appropriate.

FIGS. 4D1 and 4D2 each illustrate a state where the bending member 281 is bent at a position 200F and the display unit 222 is divided into a first region 222(a) and a second region 222(b).

In FIG. 4D1, for example, the bending member 281 is bent inward such that the first region 222(a) faces a user and the second region 222(b) faces upward.

In accordance with a program for the arithmetic device 210, the display unit 222 is divided into the first region 222(a) and the second region 222(b) on the basis of bend position data that is supplied by the input/output device 220.

For example, a display screen of software by which e-mails can be sent and received is displayed in the first region 222(a), and a software keyboard is displayed in the second region 222(b). Thus, an e-mail that is composed with the software keyboard displayed in the second region 222(b) can be displayed and checked in the first region 222(a).

In this manner, the information processor 200 can be used as an e-mail sending/receiving device.

In FIG. 4D2, for example, the bending member 281 is bent outward such that the first region 222(a) faces a user and the second region 222(b) faces downward.

In accordance with a program for the arithmetic device 210, the display unit 222 is divided into the first region 222(a) and the second region 222(b) on the basis of bend position data that is supplied by the input/output device 220.

For example, a display screen of software by which images can be viewed is displayed in the first region 222(a), and display in the second region 222(b) is stopped. Thus, the first region 222(a) can be kept at an angle such that the user can easily view images displayed in the first region 222(a).

In this manner, the information processor 200 can be used as a digital photo frame, a moving image reproducing device, or the like.

This embodiment can be combined with any of the other embodiments in this specification as appropriate.

EMBODIMENT 3

In this embodiment, a structure of an input/output device that can be used for the information processor of one embodiment of the present invention will be described with reference to FIGS. 5A to 5C.

Figure 5A:
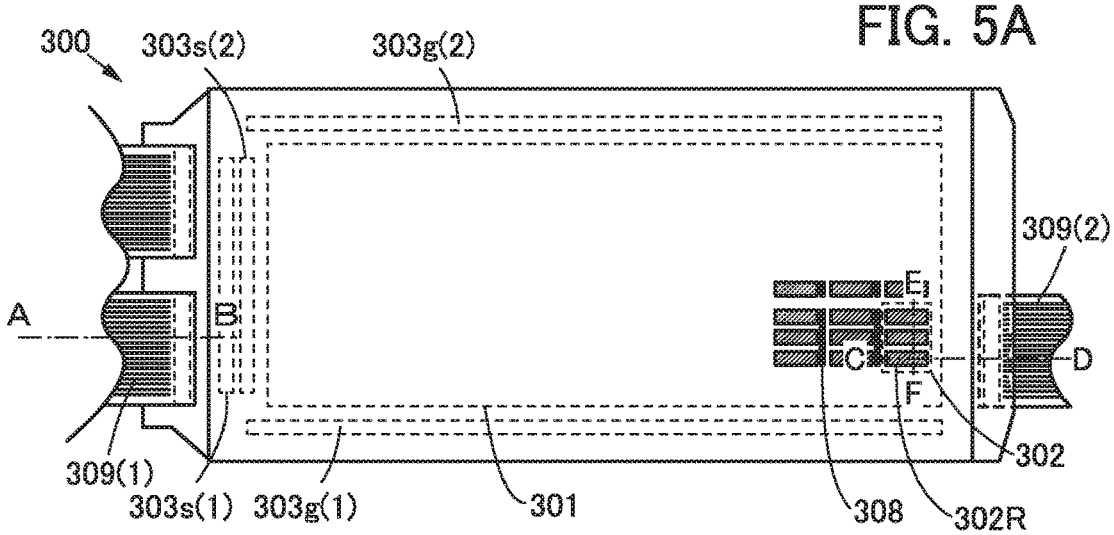
FIGS. 5A to 5C illustrate a structure of an input/output device that can be used for an information processor of one embodiment.

FIG. 5A is a plan view illustrating the structure of an input/output device that can be used in the information processor of one embodiment of the present invention.

Figure 5B:
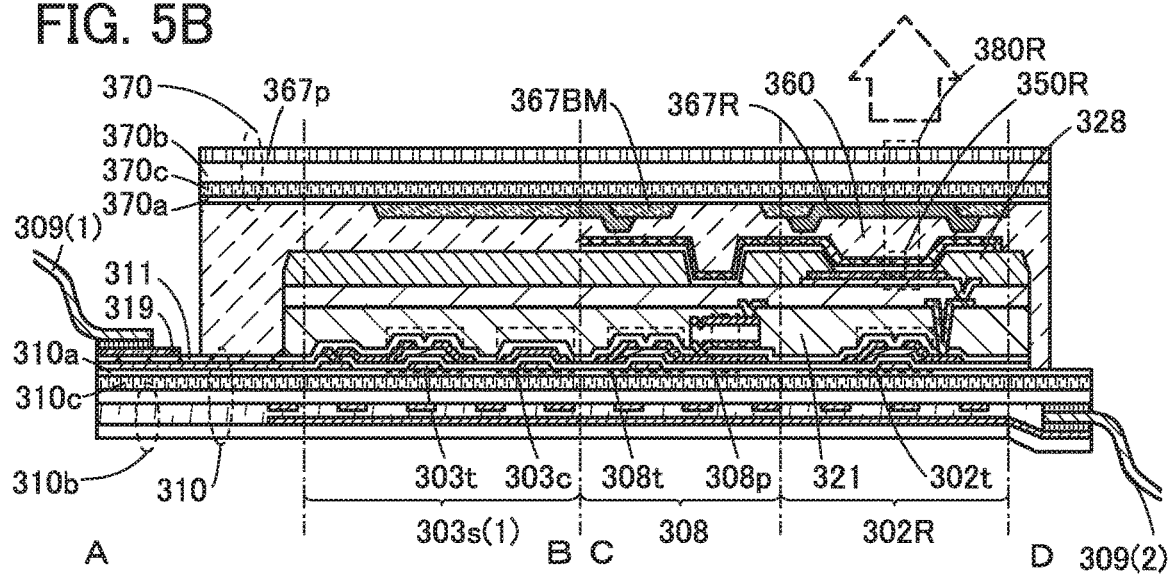

FIG. 5B is a cross-sectional view taken along line A-B and line C-D in FIG. 5A.

Figure 5C:
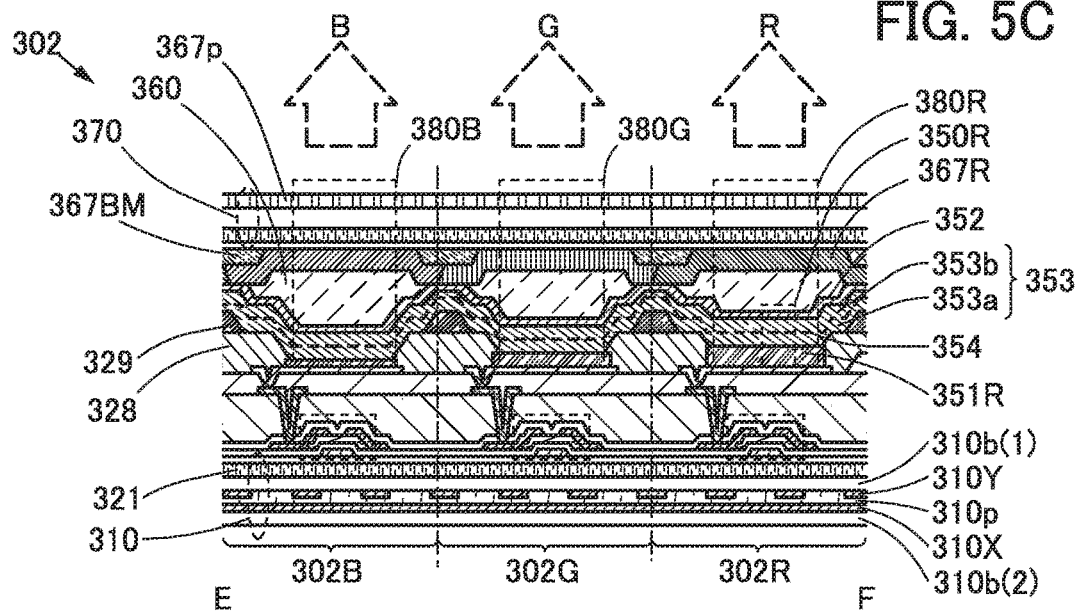

FIG. 5C is a cross-sectional view taken along line E-F in FIG. 5A.
<Plan View>

An input/output device 300 described as an example in this embodiment includes a display portion 301 (see FIG. 5A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the input/output device 300 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The input/output device 300 is provided with an imaging pixel driver circuit 303g(2) that can supply control signals to the imaging pixels 308 and an imaging signal line driver circuit 303s(2) that reads out imaging signals.

<Cross-Sectional View>

The input/output device 300 includes a substrate 310 and a counter substrate 370 that faces the substrate 310 (see FIG. 5B).

The substrate 310 is a stacked body in which a flexible substrate 310b, a barrier film 310a that prevents diffusion of unintentional impurities to the light-emitting elements, and an adhesive layer 310c that attaches the barrier film 310a to the substrate 310b are stacked.

The substrate 310b includes a substrate 310b(1) provided with a plurality of electrodes 310Y, a substrate 310b(2) provided with a plurality of electrodes 310X, and a flexible printed circuit (FPC 309(2)) through which the plurality of electrodes 310Y and the plurality of electrodes 310X can supply signals (see FIGS. 5B and 5C).

The electrode 310Y and the electrode 310X are provided to intersect with each other, and a functional polymer 310p is provided between the electrode 310Y and the electrode 310X.

The electrode 310Y, the electrode 310X, and the functional polymer 310p provided between the electrode 310Y and the electrode 310X form a pressure sensor. Thus, pressure sensors are provided in a matrix to form a bend position sensor.

Note that a structure may be employed in which electrical resistance between the electrode 310Y and the electrode 310X is changed by deformation due to pressure. For example, a piezoelectric polymer can be used as the functional polymer 310p. Specifically, the functional polymer 310p is deformed by pressure and the contact area between the electrode 310Y and the electrode 310X is increased, whereby the electrical resistance is reduced.

The counter substrate 370 is a stacked body including a flexible substrate 370b, a barrier film 370a that prevents diffusion of unintentional impurities to the light-emitting elements, and an adhesive layer 370c that attaches the barrier film 370a to the substrate 370b (see FIG. 5B).

A sealant 360 attaches the counter substrate 370 to the substrate 310. The sealant 360, also serving as an optical adhesive layer, has a refractive index higher than that of air. The pixel circuits and the light-emitting elements (e.g., a first light-emitting element 350R) are provided between the substrate 310 and the counter substrate 370.

<<Structure of Pixel>>

Each of the pixels 302 includes a sub-pixel 302R, a sub-pixel 302G, and a sub-pixel 302B (see FIG. 5C). The sub-pixels 302R, 302G, and 302B can, for example, emit red light, green light, and blue light, respectively. The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 5B). Furthermore, the light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352.

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light of a particular wavelength and is, for example, a layer that selectively transmits light of red, green, or blue color. A region that transmits light emitted from the light-emitting element as it is may be provided as well.

The light-emitting module 380R, for example, includes the sealant 360 that also serves as an optical adhesive layer and is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in FIGS. 5B and 5C.

<<Structure of Display Panel>>

The input/output device 300 includes a light-blocking layer 367BM on the counter substrate 370. The light-blocking layer 367BM is provided so as to surround the coloring layer (e.g., the first coloring layer 367R).

The input/output device 300 includes an anti-reflective layer 367p positioned in a region overlapping with the display portion 301. As the anti-reflective layer 367p, a circular polarizing plate can be used, for example.

The input/output device 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The input/output device 300 includes the light-emitting elements (e.g., the first light-emitting element 350R) over the insulating film 321.

The input/output device 300 includes, over the insulating film 321, a partition wall 328 that overlaps with an end portion of the first lower electrode 351R (see FIG. 5C). In addition, a spacer 329 that controls the distance between the substrate 310 and the counter substrate 370 is provided on the partition wall 328.

<<Structure of Image Signal Line Driver Circuit>>

The image signal line driver circuit 303s(1) includes a transistor 303t and a capacitor 303c. Note that the driver circuit can be formed in the same process and over the same substrate as those of the pixel circuits.

<<Structure of Imaging Pixel>>

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

<<Other Structures>>

The input/output device 300 includes a wiring 311 through which a signal can be supplied. The wiring 311 is provided with a terminal 319. Note that an FPC 309(1) through which a signal such as an image signal or a synchronization signal can be supplied is electrically connected to the terminal 319.

Note that a printed wiring board (PWB) may be attached to the FPC 309(1).

This embodiment can be combined with any of the other embodiments in this specification as appropriate.

EMBODIMENT 4

In this embodiment, a structure of a bendable touch panel that can be used in the information processor of one embodiment of the present invention will be described with reference to FIGS. 7A and 7B and FIGS. 8A to 8C.

Figure 7A:
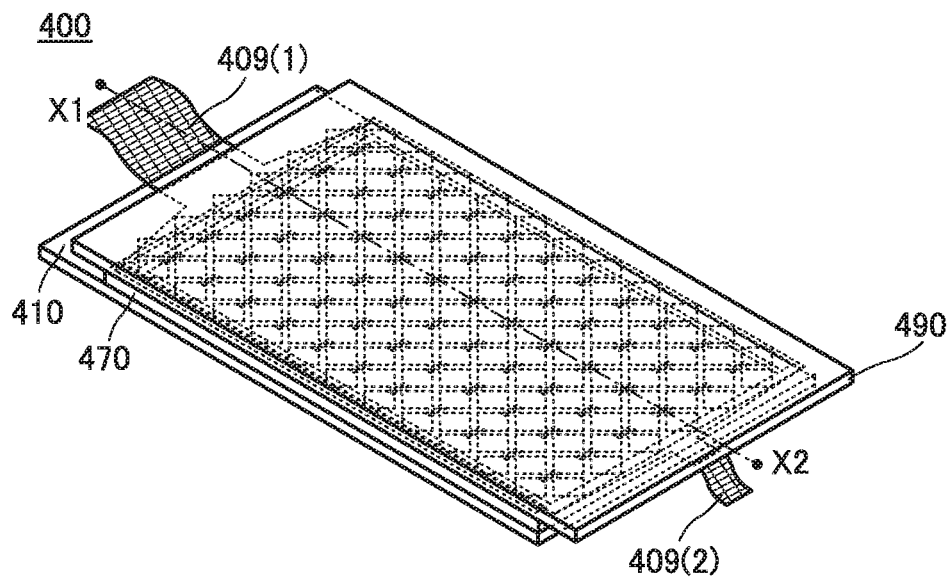
FIGS. 7A and 7B illustrate a structure of a touch panel that can be used in an information processor of one embodiment.
Figure 7B:
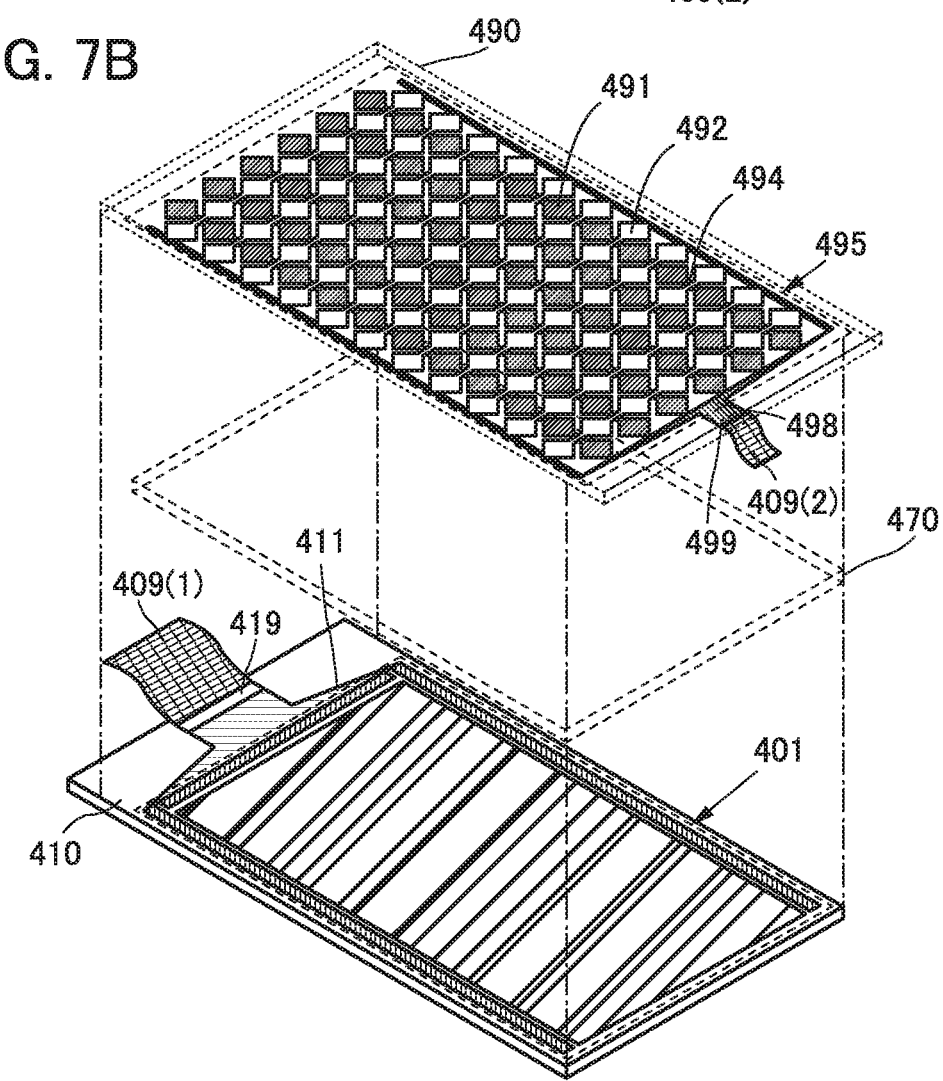

FIGS. 7A and 7B are perspective views illustrating typical components of a touch panel of one embodiment of the present invention. FIG. 7A is a perspective view of a touch panel 400, and FIG. 7B is a perspective view illustrating the components of the touch panel 400 in a separated state.

Figure 8A:
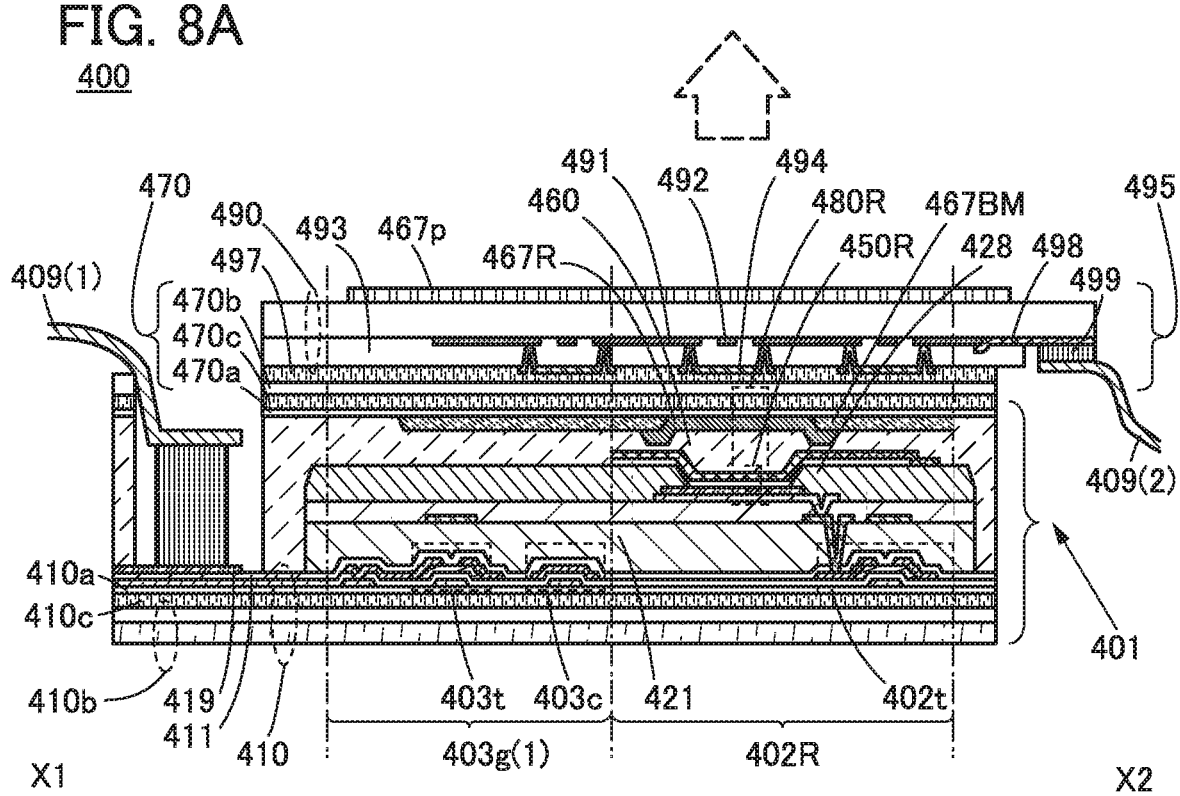
FIGS. 8A to 8C illustrate structures of a touch panel that can be used in an information processor of one embodiment.
Figure 8B:
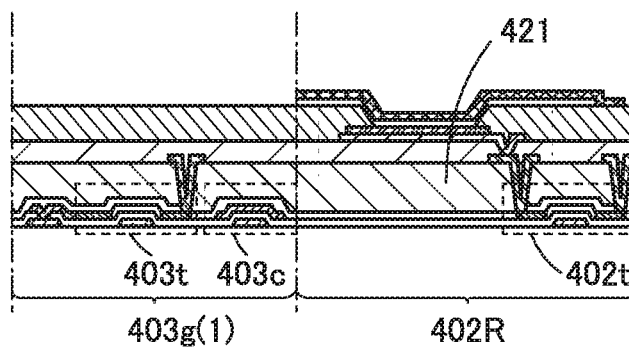
Figure 8C:
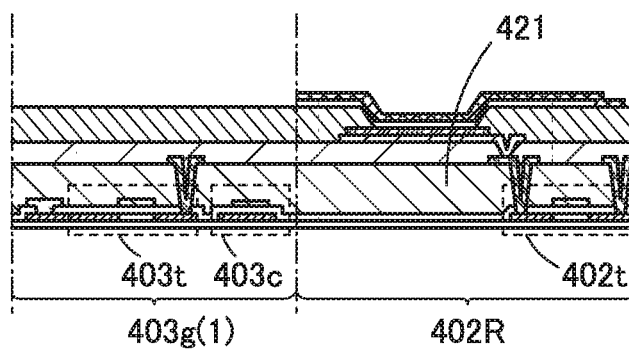

FIGS. 8A to 8C are cross-sectional views of the touch panel 400 taken along line X1-X2 in FIG. 7A.

The touch panel 400 includes a display portion 401 and a touch sensor 495 (see FIG. 7B). Furthermore, the touch panel 400 includes a substrate 410, a substrate 470, and a substrate 490. Note that the substrate 410, the substrate 470, and the substrate 490 each have flexibility.

The display portion 401 includes the substrate 410, a plurality of pixels over the substrate 410, and a plurality of wirings 411 through which signals are supplied to the pixels. The plurality of wirings 411 is led to a peripheral portion of the substrate 410, and part of the plurality of wirings 411 forms a terminal 419. The terminal 419 is electrically connected to an FPC 409(1).

<Touch Sensor>

The substrate 490 includes the touch sensor 495 and a plurality of wirings 498 electrically connected to the touch sensor 495. The plurality of wirings 498 is led to a peripheral portion of the substrate 490, and part of the plurality of wirings 498 forms a terminal. The terminal is electrically connected to an FPC 409(2). Note that in FIG. 7B, electrodes, wirings, and the like of the touch sensor 495 provided on the back side of the substrate 490 (the side opposite to the viewer side) are indicated by solid lines for clarity.

As the touch sensor 495, a capacitive touch sensor can be used. Examples of the capacitive touch sensor are a surface capacitive touch sensor and a projected capacitive touch sensor.

Examples of the projected capacitive touch sensor are a self capacitive touch sensor and a mutual capacitive touch sensor, which differ mainly in the driving method. The use of a mutual capacitive type is preferable because multiple points can be sensed simultaneously.

An example of using a projected capacitive touch sensor is described below with reference to FIG. 7B.

Note that a variety of sensors that can sense the closeness or the contact of a sensing target such as a finger, can be used.

The projected capacitive touch sensor 495 includes electrodes 491 and electrodes 492. The electrodes 491 are electrically connected to any of the plurality of wirings 498, and the electrodes 492 are electrically connected to any of the other wirings 498.

The electrodes 492 each have a shape of a plurality of quadrangles arranged in one direction with one corner of a quadrangle connected to one corner of another quadrangle as illustrated in FIGS. 7A and 7B.

A plurality of electrodes 491 each have a quadrangular shape and are arranged in a direction intersecting with the direction in which the electrodes 492 extend.

A wiring 494 electrically connects two electrodes 491 between which the electrode 492 is positioned. The intersecting area of the electrode 492 and the wiring 494 is preferably as small as possible. Such a structure allows a reduction in the area of a region where the electrodes are not provided, reducing unevenness in transmittance. As a result, unevenness in luminance of light from the touch sensor 495 can be reduced.

Note that the shapes of the electrodes 491 and the electrodes 492 are not limited to the above-mentioned shapes and can be any of a variety of shapes. For example, the plurality of electrodes 491 may be provided so that space between the electrodes 491 are reduced as much as possible, and a plurality of electrodes 492 may be provided with an insulating layer sandwiched between the electrodes 491 and the electrodes 492 and may be spaced apart from each other to form a region not overlapping with the electrodes 491. In that case, between two adjacent electrodes 492, it is preferable to provide a dummy electrode which is electrically insulated from these electrodes, whereby the area of a region having a different transmittance can be reduced.

A structure of the touch sensor 495 will be described with reference to FIGS. 8A to 8C.

The touch sensor 495 includes the substrate 490, the electrodes 491 and the electrodes 492 provided in a staggered arrangement on the substrate 490, an insulating layer 493 covering the electrodes 491 and the electrodes 492, and the wiring 494 that electrically connects the adjacent electrodes 491 to each other.

A resin layer 497 attaches the substrate 490 to the substrate 470 so that the touch sensor 495 overlaps with the display portion 401.

The electrodes 491 and the electrodes 492 are formed using a light-transmitting conductive material. As a light-transmitting conductive material, a conductive oxide such as indium oxide, indium tin oxide, indium zinc oxide, zinc oxide, or zinc oxide to which gallium is added can be used. Note that a film including graphene may be used as well. The film including graphene can be formed, for example, by reducing a film containing graphene oxide. As a reducing method, a method with application of heat or the like can be employed.

The electrodes 491 and the electrodes 492 may be formed by depositing a light-transmitting conductive material on the substrate 490 by a sputtering method and then removing an unnecessary portion by any of various patterning techniques such as photolithography.

Examples of a material for the insulating layer 493 are a resin such as acrylic or epoxy resin, a resin having a siloxane bond, and an inorganic insulating material such as silicon oxide, silicon oxynitride, or aluminum oxide.

Furthermore, openings reaching the electrodes 491 are formed in the insulating layer 493, and the wiring 494 electrically connects the adjacent electrodes 491. A light-transmitting conductive material can be favorably used as the wiring 494 because the aperture ratio of the touch panel can be increased. Moreover, a material with higher conductivity than the conductivities of the electrodes 491 and 492 can be favorably used because electric resistance can be reduced.

One electrode 492 extends in one direction, and a plurality of electrodes 492 is provided in the form of stripes.

The wiring 494 intersects with the electrode 492.

Adjacent electrodes 491 are provided with one electrode 492 provided therebetween. The wiring 494 electrically connects the adjacent electrodes 491.

Note that the plurality of electrodes 491 is not necessarily arranged in the direction orthogonal to one electrode 492 and may be arranged to intersect with one electrode 492 at an angle of less than 90 degrees.

One wiring 498 is electrically connected to any of the electrodes 491 and 492. Part of the wiring 498 serves as a terminal. For the wiring 498, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 493 and the wiring 494 may be provided to protect the touch sensor 495.

Furthermore, a connection layer 499 electrically connects the wiring 498 to the FPC 409(2).

As the connection layer 499, any of various anisotropic conductive films (ACF), anisotropic conductive pastes (ACP), or the like can be used.

The resin layer 497 has a light-transmitting property. For example, a thermosetting resin or an ultraviolet curable resin can be used; specifically, a resin such as acrylic, urethane, epoxy resin, or a resin having a siloxane bond can be used.

<Display Portion>

The display portion 401 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such element.

For example, organic electroluminescent elements that emit light of different colors may be included in sub-pixels so that the light of different colors can be emitted from the respective sub-pixels.

Other than organic electroluminescent elements, any of various display elements such as display elements (electronic ink) that perform display by an electrophoretic method, an electronic liquid powder method, an electrowetting method, or the like; MEMS shutter display elements; optical interference type MEMS display elements; and liquid crystal elements can be used. Furthermore, this embodiment can be used in a transmissive liquid crystal display, a transflective liquid crystal display, a reflective liquid crystal display, a direct-view liquid crystal display, or the like. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. A structure suitable for employed display elements can be selected from among a variety of structures of pixel circuits.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, an MIM (metal insulator metal), a TFD (thin film diode), or the like can also be used. Since these elements can be formed with a smaller number of manufacturing steps, manufacturing cost can be reduced or yield can be improved. Furthermore, since the size of these elements is small, the aperture ratio can be improved, so that power consumption can be reduced or higher luminance can be achieved.

As a method other than an active matrix method, a passive matrix method in which an active element (a non-linear element) is not used can also be used. Since an active element (a non-linear element) is not used, the number of manufacturing steps is small, so that manufacturing cost can be reduced or yield can be improved. Furthermore, since an active element (a non-linear element) is not used, the aperture ratio can be improved, so that power consumption can be reduced or higher luminance can be achieved, for example.

Flexible materials can be favorably used for the substrate 410 and the substrate 470.

Materials with which unintended passage of impurities is inhibited can be favorably used for the substrate 410 and the substrate 470. For example, materials with a vapor permeability of lower than or equal to $10^{-5}$ g/m²·day, preferably lower than or equal to $10^{-6}$ g/m²·day can be favorably used.

The substrate 410 can be favorably formed using a material whose coefficient of linear expansion is substantially equal to that of the substrate 470. For example, the coefficient of linear expansion of the materials are preferably lower than or equal to $1\times10^{-3}$/K, further preferably lower than or equal to $5\times10^{-5}$/K, and still further preferably lower than or equal to $1\times10^{-5}$/K.

The substrate 410 is a stacked body in which a flexible substrate 410b, a barrier film 410a that prevents diffusion of unintentional impurities to light-emitting elements, and a resin layer 410c that attaches the barrier film 410a to the substrate 410b are stacked.

For example, materials that include polyester, polyolefin, polyamide (e.g., nylon, aramid), polyimide, polycarbonate, acrylic, urethane, epoxy resin, or a resin having a siloxane bond can be used for the resin layer 410c.

The substrate 470 is a stacked body in which a flexible substrate 470b, a barrier film 470a that prevents diffusion of unintentional impurities to the light-emitting elements, and a resin layer 470c that attaches the barrier film 470a to the substrate 470b are stacked.

A sealant 460 attaches the substrate 470 to the substrate 410. The sealant 460 has a refractive index higher than that of air. In the case of extracting light to the sealant 460 side, the sealant 460 serves as an optical adhesive layer. The pixel circuits and the light-emitting elements (e.g., a first light-emitting element 450R) are provided between the substrate 410 and the substrate 470.

<<Structure of Pixel>>

A pixel includes a sub-pixel 402R, and the sub-pixel 402R includes a light-emitting module 480R.

The sub-pixel 402R includes the first light-emitting element 450R and the pixel circuit that can supply electric power to the first light-emitting element 450R and includes a transistor 402t. Furthermore, the light-emitting module 480R includes the first light-emitting element 450R and an optical element (e.g., a first coloring layer 467R).

The first light-emitting element 450R includes a lower electrode, an upper electrode, and a layer containing a light-emitting organic compound between the lower electrode and the upper electrode.

The light-emitting module 480R includes the first coloring layer 467R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

In the case where the sealant 460 is provided on the light extraction side, the sealant 460 is in contact with the first light-emitting element 450R and the first coloring layer 467R.

The first coloring layer 467R is positioned in a region overlapping with the first light-emitting element 450R. Accordingly, part of light emitted from the first light-emitting element 450R passes through the first coloring layer 467R and is emitted to the outside of the light-emitting module 480R as indicated by an arrow in FIG. 8A.

<<Structure of Display Portion>>

The display portion 401 includes a light-blocking layer 467BM on the light extraction side. The light-blocking layer 467BM is provided so as to surround the coloring layer (e.g., the first coloring layer 467R).

The display portion 401 includes an anti-reflective layer 467p positioned in a region overlapping with pixels. As the anti-reflective layer 467p, a circular polarizing plate can be used, for example.

The display portion 401 includes an insulating film 421. The insulating film 421 covers the transistor 402t. Note that the insulating film 421 can be used as a layer for planarizing unevenness caused by the pixel circuits. A stacked film including a layer that can prevent diffusion of impurities can be used as the insulating film 421. This can prevent the reliability of the transistor 402t or the like from being lowered by diffusion of unintentional impurities.

The display portion 401 includes the light-emitting elements (e.g., the first light-emitting element 450R) over the insulating film 421.

The display portion 401 includes, over the insulating film 421, a partition wall 428 that overlaps with an end portion of the lower electrode. In addition, a spacer that controls the distance between the substrate 410 and the substrate 470 is provided on the partition wall 428.

<<Structure of Scan Line Driver Circuit>>

A scan line driver circuit 403g(1) includes a transistor 403t and a capacitor 403c. Note that the driver circuit can be formed in the same process and over the same substrate as those of the pixel circuits.

<<Other Structures>>

The display portion 401 includes the wirings 411 through which signals can be supplied. The wirings 411 are provided with the terminal 419. Note that the FPC 409(1) through which a signal such as an image signal or a synchronization signal can be supplied is electrically connected to the terminal 419.

Note that a printed wiring board (PWB) may be attached to the FPC 409(1).

The display portion 401 includes wirings such as scan lines, signal lines, and power supply lines. Any of various conductive films can be used as the wirings.

Specifically, a metal element selected from aluminum, chromium, copper, tantalum, titanium, molybdenum, tungsten, nickel, yttrium, zirconium, silver, and manganese; an alloy including any of the above-described metal elements; an alloy including any of the above-described metal elements in combination; or the like can be used. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a stacked structure in which a film of an element selected from titanium, tantalum, tungsten, molybdenum, chromium, neodymium, and scandium, an alloy film including some of these elements, or a nitride film of any of these elements is stacked over an aluminum film can be used.

Alternatively, a light-transmitting conductive material including indium oxide, tin oxide, or zinc oxide may be used.

MODIFICATION EXAMPLE 1 OF DISPLAY PORTION

Any of various kinds of transistors can be used in the display portion 401.

A structure in the case of using bottom-gate transistors in the display portion 401 is illustrated in FIGS. 8A and 8B.

For example, a semiconductor layer containing an oxide semiconductor, amorphous silicon, or the like can be used in the transistor 402t and the transistor 403t illustrated in FIG. 8A.

For example, a film represented by an In-M-Zn oxide that contains at least indium (In), zinc (Zn), and M (M is a metal such as Al, Ga, Ge, Y, Zr, Sn, La, Ce, or Hf) is preferably included. Alternatively, both In and Zn are preferably contained.

As a stabilizer, gallium (Ga), tin (Sn), hafnium (Hf), aluminum (Al), zirconium (Zr), or the like can be used. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be used.

As an oxide semiconductor included in an oxide semiconductor film, any of the followings can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, for example, an "In—Ga—Zn-based oxide" means an oxide containing In, Ga, and Zn as its main components and there is no limitation on the ratio of In:Ga:Zn. The In—Ga—Zn oxide may contain another metal element in addition to In, Ga, and Zn.

For example, a semiconductor layer containing polycrystalline silicon that is obtained by crystallization process such as laser annealing can be used in the transistor 402t and the transistor 403t illustrated in FIG. 8B.

A structure in the case of using top-gate transistors in the display portion 401 is illustrated in FIG. 8C.

For example, a semiconductor layer including a polycrystalline silicon film, a single crystal silicon film that is transferred from a single crystal silicon substrate, or the like can be used in the transistor 402t and the transistor 403t illustrated in FIG. 8C.

This embodiment can be combined with any of the other embodiments in this specification as appropriate.

EMBODIMENT 5

In this embodiment, a structure of a bendable touch panel that can be used in the information processor of one embodiment of the present invention will be described with reference to FIGS. 9A to 9C.

Figure 9A:
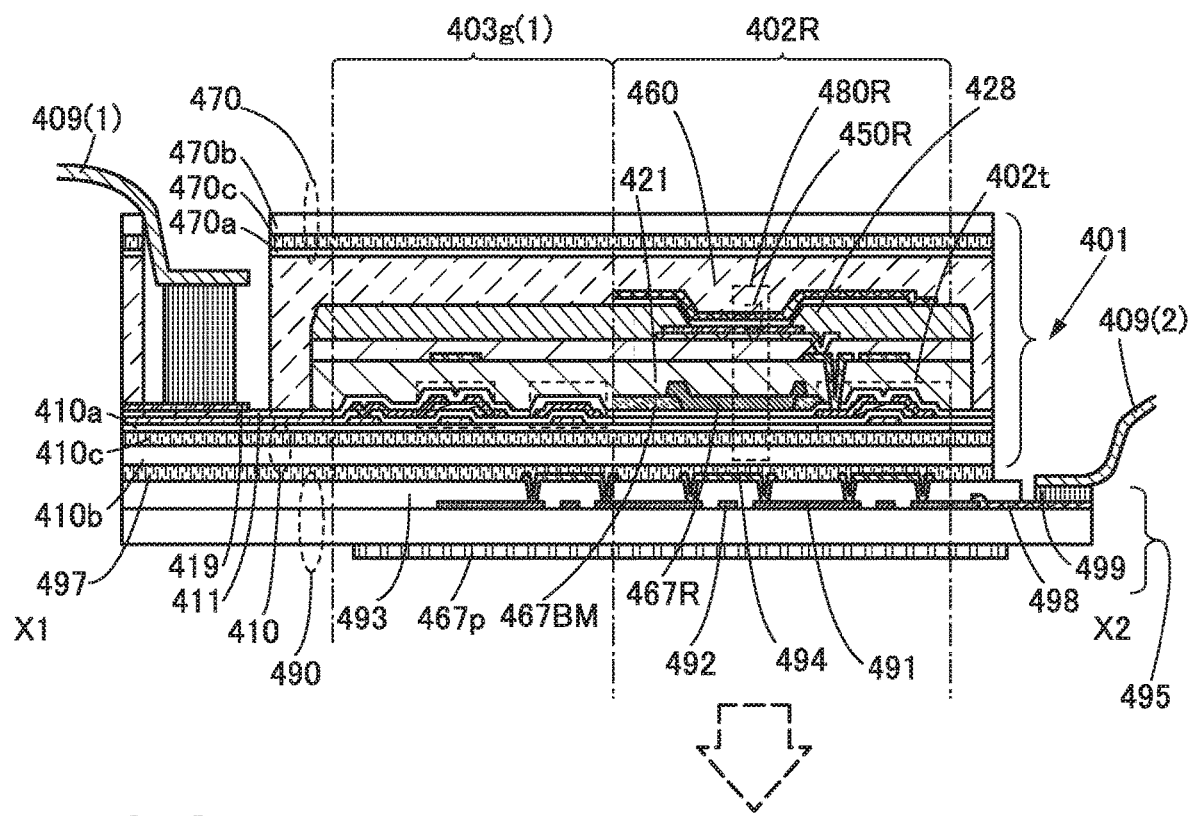
FIGS. 9A to 9C illustrate structures of a touch panel that can be used in an information processor of one embodiment.
Figure 9B:
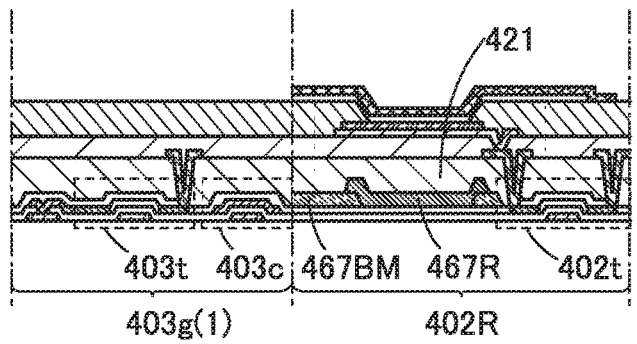
Figure 9C:
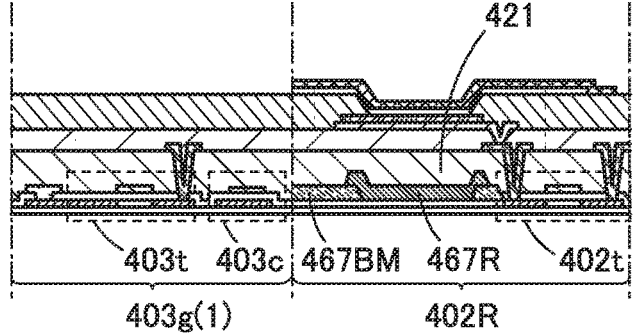

FIGS. 9A to 9C are cross-sectional views illustrating a structure of a touch panel 400B.

The touch panel 400B described in this embodiment differs from the touch panel 400 described in Embodiment 4 in that the display portion 401 displays received image data on the side where the transistors are provided and that the touch sensor is provided on the substrate 410 side of the display portion. Different structures will be described in detail below, and the above description is referred to for the other similar structures.

<Display Portion>

The display portion 401 includes a plurality of pixels arranged in a matrix. Each of the pixels includes a display element and a pixel circuit for driving the display element.

<<Structure of Pixel>>

A pixel includes the sub-pixel 402R, and the sub-pixel 402R includes the light-emitting module 480R.

The sub-pixel 402R includes the first light-emitting element 450R and the pixel circuit that can supply electric power to the first light-emitting element 450R and includes the transistor 402t.

The light-emitting module 480R includes the first light-emitting element 450R and an optical element (e.g., the first coloring layer 467R).

The first light-emitting element 450R includes a lower electrode, an upper electrode, and a layer containing a light-emitting organic compound between the lower electrode and the upper electrode.

The light-emitting module 480R includes the first coloring layer 467R on the light extraction side. The coloring layer transmits light of a particular wavelength and is, for example, a layer that selectively transmits light of red, green, or blue color.

Note that in another sub-pixel, a region that transmits light emitted from the light-emitting element as it is may be provided as well.

The first coloring layer 467R is positioned in a region overlapping with the first light-emitting element 450R. The first light-emitting element 450R illustrated in FIG. 9A emits light to the side where the transistor 402t is provided. Accordingly, part of light emitted from the first light-emitting element 450R passes through the first coloring layer 467R and is emitted to the outside of the light-emitting module 480R as indicated by an arrow in FIG. 9A.

<<Structure of Display Portion>>

The display portion 401 includes the light-blocking layer 467BM on the light extraction side. The light-blocking layer 467BM is provided so as to surround the coloring layer (e.g., the first coloring layer 467R).

The display portion 401 includes the insulating film 421. The insulating film 421 covers the transistor 402t. Note that the insulating film 421 can be used as a layer for planarizing unevenness caused by the pixel circuits. A stacked film including a layer that can prevent diffusion of impurities can be used as the insulating film 421. This can prevent reliability of the transistor 402t or the like from being lowered by diffusion of unintentional impurities from the first coloring layer 467R.

<Touch Sensor>

The touch sensor 495 is provided on the substrate 410 side of the display portion 401 (see FIG. 9A).

The resin layer 497 is provided between the substrate 410 and the substrate 490 and attaches the touch sensor 495 to the display portion 401.

MODIFICATION EXAMPLE 1 OF DISPLAY PORTION

Any of various kinds of transistors can be used in the display portion 401.

A structure in the case of using bottom-gate transistors in the display portion 401 is illustrated in FIGS. 9A and 9B.

For example, a semiconductor layer containing an oxide semiconductor, amorphous silicon, or the like can be used in the transistor 402t and the transistor 403t illustrated in FIG. 9A. In the transistors, a channel formation region may be sandwiched between upper and lower gate electrodes, in which case variations in characteristics of the transistors can be prevented and thus the reliability can be increased.

For example, a semiconductor layer containing polycrystalline silicon or the like can be used in the transistor 402t and the transistor 403t illustrated in FIG. 9B.

A structure in the case of using top-gate transistors in the display portion 401 is illustrated in FIG. 9C.

For example, a semiconductor layer including a polycrystalline silicon film, a transferred single crystal silicon film, or the like can be used in the transistor 402t and the transistor 403t illustrated in FIG. 9C.

This embodiment can be combined with any of the other embodiments in this specification as appropriate.

EXPLANATION OF REFERENCE

100: information processor, 100F: broken line, 100S: acceleration sensor, 110: arithmetic device, 111: arithmetic unit, 112: storage unit, 114: transmission path, 115: input/output interface, 120: input/output device, 121: input unit, 122: display unit, 122(a): first region, 122(b): second region, 123: position sensor, 200: information processor, 200F: position, 210: arithmetic device, 220: input/output device, 222: display unit, 222(a): first region, 222(b): second region, 281: bending member, 282: hinge component, 300: input/output device, 301: display portion, 302: pixel, 302B: sub-pixel, 302G: sub-pixel, 302R: sub-pixel, 302t: transistor, 303c: capacitor, 303g(1): scan line driver circuit, 303g(2): imaging pixel driver circuit, 303s(1):

image signal line driver circuit, 303s(2): imaging signal line driver circuit, 303t: transistor, 308: imaging pixel, 308p: photoelectric conversion element, 308t: transistor, 309: FPC, 310: substrate, 310a: barrier film, 310b: substrate, 310c: adhesive layer, 310p: functional polymer, 310X: electrode, 310Y: electrode, 311: wiring, 319: terminal, 321: insulating film, 328: partition wall, 329: spacer, 350R: light-emitting element, 351R: lower electrode, 352: upper electrode, 353: layer containing a light-emitting organic compound, 353a: light-emitting unit, 353b: light-emitting unit, 354: intermediate layer, 360: sealant, 367BM: light-blocking layer, 367p: anti-reflective layer, 367R: coloring layer, 370:

counter substrate, 370a: barrier film, 370b: substrate, 370c: adhesive layer, 380B: light-emitting module, 380G: light-emitting module, 380R: light-emitting module, 400: touch panel, 400B: touch panel, 401: display portion, 402R: sub-pixel, 402t: transistor, 403c: capacitor, 403g: scan line driver circuit, 403t: transistor, 409: FPC, 410: substrate, 410a: barrier film, 410b: substrate, 410c: resin layer, 411: wiring, 419: terminal, 421: insulating film, 428: partition wall, 450R: light-emitting element, 460: sealant, 467BM: light-blocking layer, 467p: anti-reflective layer, 467R: coloring layer, 470: substrate, 470a: barrier film, 470b: substrate, 470c: resin layer, 480R: light-emitting module, 490: substrate, 491: electrode, 492: electrode, 493: insulating layer, 494: wiring, 495: touch sensor, 497: resin layer, 498: wiring, 499: connection layer, C: center, E: edge closer to the center, F: bend position.

This application is based on Japanese Patent Application serial no. 2013-120654 filed with Japan Patent Office on Jun. 7, 2013, the entire contents of which are hereby incorporated by reference.

The invention claimed is:

1. A semiconductor device comprising:
an input/output device comprising:
a bending member comprising a plurality of hinge components; and
a display unit that is supported so as to be bent in accordance with bending of the bending member; and
an arithmetic device that supplies image data to the input/output device,
wherein the semiconductor device is configured to display an image in a first region of the display unit, and stop display in a second region of the display unit, when the display unit is bent outward, and is configured to display an image in a seamless screen including the first region and the second region, when the display unit is not bent,
wherein the plurality of hinge components is 5 or more,
wherein the 5 or more hinge components are connected to each other and bend in a same direction, and
wherein the bending member is provided along opposite sides of the display unit.

2. The semiconductor device according to claim 1, wherein a bent portion of the display unit is visible by a user.

3. The semiconductor device according to claim 1, wherein the semiconductor device is configured to be bent at a plurality of positions.

4. The semiconductor device according to claim 1, wherein the plurality of hinge components is aligned along a side of the semiconductor device.

5. The semiconductor device according to claim 1, further comprising:
a ratchet mechanism or a unit to prevent slipping.

* * * * *